US009780365B2

(12) United States Patent
Liu et al.

(10) Patent No.: US 9,780,365 B2
(45) Date of Patent: Oct. 3, 2017

(54) HIGH-CAPACITY ELECTRODES WITH ACTIVE MATERIAL COATINGS ON MULTILAYERED NANOSTRUCTURED TEMPLATES

(75) Inventors: Zuqin Liu, Sunnyvale, CA (US); Song Han, Foster City, CA (US); Ghyrn E. Loveness, East Palo Alto, CA (US)

(73) Assignee: Amprius, Inc., Sunnyvale, CA (US)

( * ) Notice: Subject to any disclaimer, the term of this patent is extended or adjusted under 35 U.S.C. 154(b) by 462 days.

(21) Appl. No.: 13/277,821

(22) Filed: Oct. 20, 2011

(65) Prior Publication Data
US 2012/0070741 A1 Mar. 22, 2012

Related U.S. Application Data

(63) Continuation-in-part of application No. 13/039,031, filed on Mar. 2, 2011, now Pat. No. 8,257,866, which
(Continued)

(51) Int. Cl.
*H01M 4/38* (2006.01)
*B82Y 30/00* (2011.01)
(Continued)

(52) U.S. Cl.
CPC ............. *H01M 4/386* (2013.01); *B82Y 30/00* (2013.01); *H01M 4/0428* (2013.01);
(Continued)

(58) Field of Classification Search
None
See application file for complete search history.

(56) References Cited

U.S. PATENT DOCUMENTS

| 4,366,215 A | 12/1982 | Coetzer et al. |
| 4,436,796 A | 3/1984 | Huggins et al. |

(Continued)

FOREIGN PATENT DOCUMENTS

| CN | 1476645 A | 2/2004 |
| CN | 1705148 | 12/2005 |

(Continued)

OTHER PUBLICATIONS

U.S. Appl. No. 12/787,138, Final Office Action mailed Oct. 11, 2012.
(Continued)

*Primary Examiner* — Ula C Ruddock
*Assistant Examiner* — Tony Chuo
(74) *Attorney, Agent, or Firm* — Weaver Austin Villeneuve & Sampson LLP

(57) ABSTRACT

Provided are battery electrode structures that maintain high mass loadings (i.e., large amounts per unit area) of high capacity active materials in the electrodes without deteriorating their cycling performance. These mass loading levels correspond to capacities per electrode unit area that are suitable for commercial electrodes even though the active materials are kept thin and generally below their fracture limits. A battery electrode structure may include multiple template layers. An initial template layer may include nanostructures attached to a substrate and have a controlled density. This initial layer may be formed using a controlled thickness source material layer provided, for example, on a substantially inert substrate. Additional one or more template layers are then formed over the initial layer resulting in a multilayer template structure with specific characteristics, such as a surface area, thickness, and porosity. The multilayer template structure is then coated with a high capacity active material.

19 Claims, 17 Drawing Sheets

Related U.S. Application Data is a continuation-in-part of application No. 13/069,212, filed on Mar. 22, 2011, application No. 13/277,821, which is a continuation-in-part of application No. 13/114,413, filed on May 24, 2011, now Pat. No. 9,172,088.

(60) Provisional application No. 61/406,047, filed on Oct. 22, 2010, provisional application No. 61/310,183, filed on Mar. 3, 2010, provisional application No. 61/316,104, filed on Mar. 22, 2010, provisional application No. 61/347,614, filed on May 24, 2010.

(51) Int. Cl.
*H01M 4/04* (2006.01)
*H01M 4/134* (2010.01)
*H01M 4/1395* (2010.01)
*H01M 4/36* (2006.01)
*H01M 4/66* (2006.01)
*H01M 4/75* (2006.01)
*H01M 4/587* (2010.01)
*H01M 10/0525* (2010.01)

(52) U.S. Cl.
CPC ......... *H01M 4/134* (2013.01); *H01M 4/1395* (2013.01); *H01M 4/366* (2013.01); *H01M 4/38* (2013.01); *H01M 4/66* (2013.01); *H01M 4/662* (2013.01); *H01M 4/667* (2013.01); *H01M 4/75* (2013.01); *H01M 4/387* (2013.01); *H01M 4/587* (2013.01); *H01M 10/0525* (2013.01)

(56) References Cited

U.S. PATENT DOCUMENTS

| | | | |
|---|---|---|---|
| 5,457,343 A | 10/1995 | Ajayan | |
| 5,997,832 A | 12/1999 | Lieber | |
| 6,083,644 A | 7/2000 | Watanabe et al. | |
| 6,090,505 A | 7/2000 | Shimamura et al. | |
| 6,334,939 B1 | 1/2002 | Zhou | |
| 6,423,453 B1 | 7/2002 | Noda | |
| 6,514,395 B2 | 2/2003 | Zhou | |
| 6,667,099 B1 | 12/2003 | Greiner et al. | |
| 6,770,353 B1 | 8/2004 | Mardilovich et al. | |
| 7,189,476 B1 | 3/2007 | Macklin et al. | |
| 7,402,829 B2 | 7/2008 | Green | |
| 7,408,829 B2 | 8/2008 | Kuang et al. | |
| 7,682,750 B2 | 3/2010 | Chen | |
| 7,704,480 B2 | 4/2010 | Jiang et al. | |
| 7,794,840 B2 | 9/2010 | Grigorian et al. | |
| 7,816,031 B2 | 10/2010 | Cui et al. | |
| 7,816,709 B2 | 10/2010 | Balzano et al. | |
| 8,017,272 B2 | 9/2011 | Feng et al. | |
| 8,202,568 B2 | 6/2012 | Lin et al. | |
| 8,241,372 B2 | 8/2012 | Cheng et al. | |
| 8,252,245 B2 | 8/2012 | Tonkovich et al. | |
| 8,257,866 B2 | 9/2012 | Loveness et al. | |
| 8,263,258 B2 | 9/2012 | Nakazato et al. | |
| 8,450,012 B2 | 5/2013 | Cui et al. | |
| 8,491,718 B2 | 7/2013 | Chaudhari | |
| 8,556,996 B2 | 10/2013 | Loveness et al. | |
| 8,877,374 B2 | 11/2014 | Cui et al. | |
| 9,172,088 B2 | 10/2015 | Loveness et al. | |
| 9,172,094 B2 | 10/2015 | Loveness et al. | |
| 9,231,243 B2 | 1/2016 | Cui et al. | |
| 2002/0028384 A1 | 3/2002 | Krasnov et al. | |
| 2002/0061441 A1 | 5/2002 | Ogura et al. | |
| 2002/0102461 A1* | 8/2002 | Baker et al. | 429/231.4 |
| 2002/0148727 A1 | 10/2002 | Zhou et al. | |
| 2003/0175589 A1 | 9/2003 | Kaminaka et al. | |
| 2003/0178104 A1 | 9/2003 | Sekine | |
| 2003/0203139 A1 | 10/2003 | Ren et al. | |
| 2004/0023111 A1 | 2/2004 | Ohshita et al. | |
| 2004/0126659 A1 | 7/2004 | Graetz | |
| 2005/0100793 A1 | 5/2005 | Jonghe et al. | |
| 2005/0153208 A1 | 7/2005 | Konishiike et al. | |
| 2005/0175901 A1 | 8/2005 | Kawakami et al. | |
| 2005/0238810 A1 | 10/2005 | Scaringe et al. | |
| 2005/0279274 A1 | 12/2005 | Niu et al. | |
| 2006/0035149 A1 | 2/2006 | Nanba et al. | |
| 2006/0040182 A1 | 2/2006 | Kawakami et al. | |
| 2006/0097691 A1 | 5/2006 | Green | |
| 2006/0154141 A1 | 7/2006 | Salot et al. | |
| 2006/0165988 A1 | 7/2006 | Chiang et al. | |
| 2006/0204853 A1 | 9/2006 | Chen | |
| 2006/0216603 A1 | 9/2006 | Choi | |
| 2006/0261134 A1 | 11/2006 | Ho | |
| 2007/0065720 A1* | 3/2007 | Hasegawa et al. | 429/217 |
| 2007/0077433 A1 | 4/2007 | Jeong et al. | |
| 2007/0095276 A1 | 5/2007 | Sunkara et al. | |
| 2007/0148544 A1 | 6/2007 | Le | |
| 2007/0154808 A1 | 7/2007 | Konishiike et al. | |
| 2007/0190422 A1 | 8/2007 | Morris | |
| 2007/0264574 A1 | 11/2007 | Kim et al. | |
| 2008/0008844 A1 | 1/2008 | Bettge et al. | |
| 2008/0044732 A1 | 2/2008 | Salot et al. | |
| 2008/0138703 A1 | 6/2008 | Deguchi et al. | |
| 2008/0145761 A1 | 6/2008 | Petrat et al. | |
| 2008/0145762 A1 | 6/2008 | Adachi et al. | |
| 2008/0213603 A1 | 9/2008 | Kobayashi et al. | |
| 2008/0261116 A1 | 10/2008 | Burton et al. | |
| 2008/0274403 A1 | 11/2008 | Kim et al. | |
| 2008/0280169 A1 | 11/2008 | Niu et al. | |
| 2008/0280207 A1 | 11/2008 | Patoux et al. | |
| 2009/0042102 A1 | 2/2009 | Cui et al. | |
| 2009/0061319 A1 | 3/2009 | Kim et al. | |
| 2009/0068553 A1 | 3/2009 | Firsich et al. | |
| 2009/0117472 A1 | 5/2009 | Iwamoto | |
| 2009/0169996 A1 | 7/2009 | Zhamu et al. | |
| 2009/0176159 A1 | 7/2009 | Zhamu et al. | |
| 2009/0186276 A1 | 7/2009 | Zhamu et al. | |
| 2009/0188544 A1 | 7/2009 | Kobayashi et al. | |
| 2009/0214942 A1 | 8/2009 | Frank et al. | |
| 2009/0214944 A1* | 8/2009 | Rojeski | 429/142 |
| 2009/0246628 A1 | 10/2009 | Adachi et al. | |
| 2009/0263716 A1 | 10/2009 | Ramasubramanian et al. | |
| 2009/0269511 A1 | 10/2009 | Zhamu et al. | |
| 2009/0291371 A1 | 11/2009 | Konishiike et al. | |
| 2009/0305131 A1 | 12/2009 | Kumar et al. | |
| 2009/0305135 A1 | 12/2009 | Shi et al. | |
| 2009/0316335 A1 | 12/2009 | Simon et al. | |
| 2010/0043877 A1 | 2/2010 | Wang et al. | |
| 2010/0122725 A1 | 5/2010 | Buchine et al. | |
| 2010/0159337 A1 | 6/2010 | Matsumoto et al. | |
| 2010/0176337 A1 | 7/2010 | Zhamu et al. | |
| 2010/0209775 A1 | 8/2010 | Kim et al. | |
| 2010/0237272 A1 | 9/2010 | Chaudhari | |
| 2010/0266897 A1 | 10/2010 | Lee et al. | |
| 2010/0285358 A1* | 11/2010 | Cui et al. | 429/218.1 |
| 2010/0310941 A1 | 12/2010 | Kimta et al. | |
| 2010/0330419 A1 | 12/2010 | Cui et al. | |
| 2010/0330421 A1 | 12/2010 | Cui et al. | |
| 2010/0330423 A1 | 12/2010 | Cui et al. | |
| 2011/0111294 A1 | 5/2011 | Lopez et al. | |
| 2011/0111300 A1 | 5/2011 | DelHagen et al. | |
| 2011/0111304 A1 | 5/2011 | Cui et al. | |
| 2011/0143019 A1 | 6/2011 | Mosso et al. | |
| 2011/0143210 A1 | 6/2011 | Shimamura et al. | |
| 2011/0159365 A1 | 6/2011 | Loveness et al. | |
| 2011/0159367 A1 | 6/2011 | Kim et al. | |
| 2011/0189510 A1 | 8/2011 | Caracciolo et al. | |
| 2011/0205688 A1 | 8/2011 | Ray et al. | |
| 2011/0229761 A1 | 9/2011 | Cui et al. | |
| 2011/0287318 A1 | 11/2011 | Loveness et al. | |
| 2012/0028123 A1 | 2/2012 | Asair et al. | |
| 2012/0034524 A1 | 2/2012 | Caracciolo et al. | |
| 2012/0070741 A1 | 3/2012 | Liu et al. | |
| 2012/0094192 A1 | 4/2012 | Qu et al. | |
| 2012/0183856 A1 | 7/2012 | Cui et al. | |
| 2012/0301785 A1 | 11/2012 | Buchine et al. | |
| 2012/0301789 A1 | 11/2012 | Loveness et al. | |

(56) References Cited

U.S. PATENT DOCUMENTS

| | | | |
|---|---|---|---|
| 2013/0004657 A1 | 1/2013 | Xu et al. | |
| 2013/0011736 A1 | 1/2013 | Loveness et al. | |
| 2013/0320582 A1 | 12/2013 | Cui et al. | |
| 2013/0344383 A1 | 12/2013 | Loveness et al. | |
| 2015/0325852 A1 | 11/2015 | Wang et al. | |
| 2016/0013483 A1 | 1/2016 | Loveness et al. | |

FOREIGN PATENT DOCUMENTS

| | | | |
|---|---|---|---|
| CN | 1705418 A | 12/2005 | |
| CN | 1979828 A | 6/2007 | |
| CN | 101560694 | 10/2009 | |
| CN | 101561694 A | 10/2009 | |
| CN | 101953014 | 1/2011 | |
| CN | 102460782 | 5/2012 | |
| EP | 845828 | 10/2002 | |
| EP | 1494302 | 1/2005 | |
| EP | 2 427 928 | 3/2012 | |
| FR | 2880198 | 6/2006 | |
| GB | 2470056 | 11/2010 | |
| JP | S54-027937 | 3/1979 | |
| JP | H07-211320 | 8/1995 | |
| JP | H08-273660 | 10/1996 | |
| JP | 2001-135317 | 5/2001 | |
| JP | 2003-168426 | 6/2003 | |
| JP | 2007-123100 | 5/2004 | |
| JP | 2005-347076 | 12/2005 | |
| JP | 2007/012310 | 1/2007 | |
| JP | 2007-061945 | 3/2007 | |
| JP | 2007-305569 | 11/2007 | |
| JP | 2007-335198 | 12/2007 | |
| JP | 2008-026595 | 2/2008 | |
| JP | 2008-066128 | 3/2008 | |
| JP | 2008-192594 | 8/2008 | |
| JP | 2008-269827 | 11/2008 | |
| JP | 2008-277128 | 11/2008 | |
| JP | 2008-305781 | * 12/2008 | ............ H01M 4/02 |
| JP | 2008/307581 | 12/2008 | |
| JP | 2009-021226 | 1/2009 | |
| JP | 2009-043514 | 2/2009 | |
| JP | 2010-533945 | 10/2010 | |
| JP | 2010-262752 | 11/2010 | |
| JP | 2010-262754 | 11/2010 | |
| JP | 2013/510405 | 3/2013 | |
| JP | 5436440 | 3/2014 | |
| KR | 10-2007-0109118 | 11/2007 | |
| KR | 10-2009-019339 | 2/2009 | |
| WO | 2006/123049 | 11/2006 | |
| WO | 2007/083152 | 1/2007 | |
| WO | 2007/071778 | 6/2007 | |
| WO | 2007/083155 | 2/2008 | |
| WO | 2008/139157 | 11/2008 | |
| WO | 2009/008558 | 1/2009 | |
| WO | 2009/010757 | 1/2009 | |
| WO | 2009/010758 | 1/2009 | |
| WO | 2009/010759 | 1/2009 | |
| WO | 2009/061685 | 5/2009 | |
| WO | 2006/067957 | 6/2009 | |
| WO | 2009/129490 | 10/2009 | |
| WO | 2010/100599 | 9/2010 | |
| WO | 2010/122910 | 10/2010 | |
| WO | 2010/129910 | 11/2010 | |
| WO | 2010/138617 | 12/2010 | |
| WO | 2010/138619 | 12/2010 | |
| WO | 2011/015174 | 2/2011 | |
| WO | 2011/053553 | 5/2011 | |
| WO | 2011/056847 | 5/2011 | |
| WO | 2011/066818 | 6/2011 | |
| WO | 2011/094642 | 8/2011 | |
| WO | 2011/109477 | 9/2011 | |
| WO | 2011/119614 | 9/2011 | |
| WO | 2011/149958 | 12/2011 | |
| WO | 2012/027360 | 3/2012 | |
| WO | 2012/054767 | 4/2012 | |

OTHER PUBLICATIONS

S.K. Samudrala and S. Bandyopadhyay: Hybrid Nanocomposite for Nanotechnology, 2009, p. 245.

Zhang, et al., "Pyrolytic Carbon-coated Silicon/Carbon Nanotube Composites: Promising Application for Li-ion Batteries," *Int. J. Nanomanufacturing*, vol. 2, Nos. 1/2, 2008, pp. 4-15.

Office Action mailed Apr. 5, 2012 for U.S. Appl. No. 13/039,031.

Notice of allowance mailed Jul. 26, 2012 for U.S. Appl. No. 13/039,031.

"Sweet nanotech batteries: Nanotechnology could solve lithium battery charging problems," PhysOrg.com, Received online Mar. 23, 2012 from http://phys.org/news127043619.html.

Lee et al., "Anomalous growth and characterization of carbon-coated nickel silicide nanowires," Chemical Physics Letters 384, 2004, pp. 215-218.

U.S. Appl. No. 13/564,324, titled Template Electrode Structures for Depositing Action Materials, filed Aug. 1, 2012.

U.S. Appl. No. 13/540,484, "Template Electrode Structures with Enhanced Adhesion Characteristics," Liu et al., filed Jul. 2, 2012.

US Office Action mailed Sep. 17, 2012 issued in U.S. Appl. No. 13/540,484.

Quasi-2D Structures Make Better Batteries, Tyrell, James, Apr. 17, 2008, pp. 1-2.

Nickel Silicide Nanobelts and Sheets in Li-ion Anodes Capacity, Green Car Congress, Apr. 19, 2009, pp. 1-3.

US Office Action mailed Oct. 25, 2012 issued in U.S. Appl. No. 13/427,681.

Marczak et al., "The individual core/shell silicon nanowire structure probed by Raman spetroscopy," Raman Spetroscopy, Phys. Status Solidi C 6 No. 9, 2053-2055, 2009.

International Search Report and Written Opinion mailed Jun. 11, 2012, for Application No. PCT/US2011/057159.

Aifantis et al., High energy density lithium batteries, 2010 WILEY-VCH Verlag GmbH & Co., KGaA, Weinheim (Chapter 6: Next-generation anodes for secondary Li-Ion Batteries).

Kasavajjula et al., "Nano- and bulk-silicon-based insertion anodes for lithium-ion secondary cells", Journal of Power Sources 163 (2007) 1003-1039.

WO patent application No. PCT/US2010/036237, International Search Report and Written Opinion mailed Feb. 1, 2011.

WO patent application No. PCT/US2011/029440, International Search Report and Written Opinion mailed Nov. 29, 2011.

WO patent application No. PCT/US2011/037767, International Search Report and Written Opinion mailed Jan. 16, 2012.

Kang, Kibum et al., "The role of NiOx overlayers on spontaneous growth of NiSix Nanowires from Ni seed layers," Nano Letters, 2008, vol. 8, No. 2 431-436, American Chemical, Jan. 12, 2008.

U.S. Appl. No. 12/787,138, Office Action mailed Apr. 26, 2012.

Ryu et al., "Failure modes of silicon powder negative electrode in lithium secondary batteries," Electrochem. Solid-State Lett. 7, A306-A309 (2004).

Magasinki et al., "High-performance lithium-ion anodes using a hierarchical bottom-up approach," Nature Materials, Online: Mar. 14, 2010 DOI: 10.1038/NMAT2725.

Park et al., "Silicon nanotube battery anodes," Nano Letters, 2009, vol. 9, No. 11, 3844-3847.

Kim et al., "Three-dimensional porous silicon particles for use in high-performance lithium secondary batteries," Angew. Chem. Int. Ed. 2008, 47, 10151-10154.

Esmanski et al., "Silicon inverse-opal-based macroporous materials as negative electrodes for lithium ion batteries," Adv. Funct. Mater. 2009, 19, 1999-2010.

Ma et al., "Nest-like silicon nanospheres for high-capacity lithium storage," Advanced Materials, 2007, 19, 4067-4070.

U.S. Appl. No. 12/437,529, Office Action mailed May 13, 2011.

U.S. Appl. No. 12/437,529, Office Action mailed Oct. 20, 2011.

U.S. Appl. No. 12/437,529, Office Action mailed Dec. 22, 2011.

Cui, Yi et al., "Doping and electrical transport in silicon nanowires", The Journal of Physical Chemistry, vol. 104, No. 22, Jun. 8, 2000.

WO patent application No. PCT/US2010/036235, International Search Report and Written Opinion mailed Jan. 28, 2001.

(56) References Cited

OTHER PUBLICATIONS

WO patent application No. PCT/US2011/026816, International Search Report and Written Opinion mailed Oct. 18, 2011.
Cui, Li-Feng et al., "Crystallline-amorphous core-shell silicon nanowires for high capacity and high current battery electrodes," Nano Letters, 2009, vol. 9, No. 1 491-495, Dec. 23, 2008.
Kim, Cheol-Joo et al., "Spontaneous chemical vapor growth of NiSi nanowires and their metallic properties," Advanced Materials, 2007, 19, 3637-3642, Oct. 16, 2007.
Chan, Candace K. et al., "Surface chemistry and morphology of the solid electrolyte interphase on silicon nanowire lithium-ion battery anodes," Journal of Power Sources 189 (2009) 1132-1140.
Cui, Li-Feng et al., "Carbon-silicon core-shell nanowires as high capacity electrode for lithium ion batteries," Nano Letters, published on Aug. 5, 2009 on http://pubs.acs.org.
Park, Mi-Hee et al., "Supporting information for silicon nanotube battery anodes," Sep. 11, 2009.
For high-performance anode material in lithium-ion batteries, After Gutenberg, downloaded from http://jcwinnie.biz/wordpress/?p=2864 on Dec. 25, 2009.
Kang, Kibum et al., Unconventional roles of metal catalysts in chemical-vapor syntheses of singel-crystalline nanowires,: Journal of Applied Physics 105, 122407 (2009).
Zhang, Hong-Li et al., "The facile synthesis of nickel silicide nanobelts and nanosheets and their application in electrochemical energy sotrage," Nanotechnology 19 (2008) 165606, (7 pp), Mar. 20, 2008.
Chan et al., "High-performance lithium battery anodes using silicon nanowires," Nature Nanotechnology, vol. 3, Jan. 2008.
WO patent application No. PCT/US2010/034106, International Search Report and Written Opinion mailed Feb. 7, 2011.
U.S. Appl. No. 11/837,291, Office Action mailed Feb. 18, 2009.
U.S. Appl. No. 11/837,291, Office Action mailed Oct. 26, 2009.
U.S. Appl. No. 11/837,291, Office Action mailed Jan. 7, 2010.
U.S. Appl. No. 11/837,291, Office Action mailed Apr. 22, 2010.
U.S. Appl. No. 11/837,291, Notice of Allowance mailed Aug. 10, 2010.
U.S. Appl. No. 12/895,424, Office Action mailed Nov. 17, 2010.
Ying et al., "Characterization of SnO2 nanowires as anode materials for Li-ion batteries." Applied Physics Letters 87(11), 2005 (Abstract only).
Sharma et al., "Structural characteristics and connection mechanism of gold-catalyzed bridging silicon nanowires," Journal of Crystal Growth 280 (2005) 562-568.
Levitt, "Whisker Technology." Wiley Interscience, 1970.
Li et al., "Rate capabilities of nanostructured LiMn2O4 electrodes in aqueous electrolyte." J. Electrochem. Soc. 147, 2044-2049 (2000).
Sharma et al., "Thermodynamic properties of the lithium-silicon system." Journal of the Electrochemical Society 123, 1763-1768 (Dec. 1976).
Givargizov, "Fundamental aspects of VLS growth," Journal of Crystal Growth 31, 20-30 (1975).
Goldstein et al., "Melting in semiconductor nanocrystals," Science 256, 1425-1427 (Jun. 1992).
Li et al., "A high capacity nano-Si composite anode material for lithium rechargeable batteries," Electrochemical and Solid-State Letters, 2 (11) 547-549 (1999).
Uehara et al., "Thick vacuum deposited silicon films suitable for the anode of Li-ion battery," Journal of Power Sources 146, 441-444 (2005).
Westwater et al., "Growth of silicon nanowires via gold/silane vapor-liquid-solid reaction," Journal Va. Sci. Technology B 15(3), 554-557 (May/Jun. 1997).
Yazawa et al., "Effect of one monolayer of surface gold atoms on the epitaxial growth of InAs nanowhiskers," Appl. Phys. Lett. 61 (17), 2051-2053 (Oct. 1992).
EP patent application No. 08831531.2, European Search Report mailed Oct. 27, 2010.

Li et al., "Freestanding mesoporous quasi-single-crystalline Co3O4 nanowire arrays," J. Am. Chem. Soc. 2006, 128, 14258-14259, Oct. 18, 2006.
Sharma et al., "Diameter control of Ti-catalyzed silicon nanowires," Journal of Crystal Growth 267 (2004) 613-618, Apr. 20, 2004.
Pan et al., Nanobelts of Semiconduction Oxides, *Science* Mar. 9, 2001: 1947-1949.
Huang et al., Catalytic Growth of Zinc Oxide Nanowires by Vapor Transport, Adv. Mater., 13, 113-116 (2001).
Morales, et al., A Laser Ablation Method for the Synthesis of Crystalline Semiconductor Nanowires, Science vol. 279, Jan. 9, 1998.
Dick, et al A New Understanding of Au-Assisted Growth of III-V Semiconductor Nanowires, Adv. Funct. Mater. 15, 1603-1610 (2005).
Chan, C.K., et al., High-Performance Lithium Battery Anodes Using Silicon Nanowires, Nature, vol. 3, Jan. 2008.
Chan, C.K., et al., "High Capacity Li Lon Battery Anodes Using Ge Nanowires", Nano Letters, 2008, vol. 8, No. 1, 307-309.
Che, G., et al., "Carbon Nanotubule Membranes for Electrochemical Energy Storage and Production". Nature 393, 346-349 (1998).
Park, M.S. et al., "Preparation and Electrochemical Properties of SnO2 Nanowires for Application in Lithium-ion Batteries" Angew. Chem. Int. Edn 46, 750-753 (2007).
Huggins, R.A. & Nix, W.D. Decrepitation Model for Capacity Loss During Cycling of Alloys in Rechargeable Electrochemical Systems, Ionics 6, 57-63 (2000).
Lee, Y.M., et al. SEI layer formation on amorphous Si thin electrode during precycling. J. Electrochem. Soc. 154, A515-A519 (2007).
Green, M., et al al Structured silicon anodes for lithium battery applications. Electrochem. Solid State Lett. 6, A75-A79 (2003).
Ryu, J.H., et al Failure modes of silicon powder negative electrode in lithium secondary batteries. Electrochem. Solid-State Lett. 7, A306-A309 (2004).
Gao, et al., "Alloy formation in nanostructured silicon." Adv. Mater. 13, 816-819 (2001).
Wang, Y., et al. Epitaxial growth of silicon nanowires using an aluminum catalyst. Nature Naotech. 1, 186-189 (2006).
Wu, Y. et al. Controlled growth and structures of molecular-scale silicon nanowires. Nao Lett. 4, 433-436 (2004).
Zhou, Controlled Li Doping of Si Nanowires (Applied Physics Letters vol. 75, No. 16), Oct. 18, 1999.
Carbon nanofiber product sheet, Applied Science 2008, downloaded from http://www.apsci.com/ngm-pyrol.html on May 2011.
U.S. Appl. No. 13/427,681, "Electrode including nanostructures for rechargeable cells," Cui et al., filed Mar. 12, 2012.
Campbell et al., "Prepartion of mesoporous silica templated metal nanowire films on foamed nickel substrates," Microporous and Mesoporous Materials 97, 2006, 114-121.
TW patent publication No. 201238125, published Sep. 16, 2012, English Abstract.
U.S. Appl. No. 13/540,484, Notice of Allowance mailed Feb. 22, 2013.
U.S. Appl. No. 13/914,491, "Template electrode structures for depositing active materials," filed Jun. 10, 2013, Loveness et al.
U.S. Appl. No. 13/427,681, Office Action mailed Jun. 11, 2013.
WO patent application No. PCT/US2012/045313, International Search Report and Written Opinion mailed Jan. 21, 2013.
U.S. Appl. No. 12/787,138, Notice of Allowance mailed Jan. 28, 2013.
U.S. Appl. No. 13/069,212, Office Action mailed Apr. 15, 2013.
U.S. Appl. No. 13/891,035, "Interconnected hollow nanostructures containing high capacity active materials for use in rechargeable batteries," Cui et al., filed May 9, 2013.
U.S. Appl. No. 61/184,581, "Compositions containing nano-particles and a nano-structured support matrix and methods of preparation," Kumta et al., filed Jun. 5, 2009.
U.S. Appl. No. 61/229,447, "High performance silicon/carbon nanotube hierarchical anode for lithium-ion battery," Prashant N. Kumta, filed Jul. 29, 2009.
Chaudhari, P. et al. "Heteroepitaxial silicon film growth at 600 degree C for an Al—Si eutectic melt," Thin Solid Films 518 (2010) 5368-5371.

(56) References Cited

OTHER PUBLICATIONS

U.S. Appl. No. 13/427,681, Office Action mailed Oct. 2, 2013.
EP patent application No. 08831531.2, Supplemental European Search Report mailed Jul. 4, 2013.
JP patent application No. 2012-510025, Notice of Reasons for Rejection mailed Jan. 7, 2014.
Pre-Issuance Submission by Third Party dated Jan. 15, 2014, received in U.S. Appl. No. 13/914,491.
Pre-Issuance Submission by Third Party dated Jan. 21, 2014, received in U.S. Appl. No. 13/540,484.
U.S. Appl. No. 13/427,681, Office Action mailed May 21, 2014.
U.S. Appl. No. 13/114,413, Office Action mailed Jun. 19, 2014.
JP patent application No. 2012-556203, Office Action mailed Aug. 26, 2014.
CN patent application No. 201180019460.3, Office Action mailed Jul. 2, 2014.
JP patent application No. 2012-510025, Decision of Rejection mailed Aug. 5, 2014.
CN patent application No. 201080026302.6, Office Action mailed Aug. 8, 2014.
U.S. Appl. No. 13/069,212, Final Office Action mailed Aug. 7, 2013.
Chan, C.K. et al., "High-performance lithium battery anodes using silicon nanowires," Nature Nanotechnology, published online Dec. 16, 2007.
JP patent application No. 2012-513226, Japanese Office Action mailed Feb. 4, 2014.
CN patent application No. 201080023257.9, Chinese Office Action mailed Dec. 12, 2013.
Emmenegger, et al., "Carbon Nanotubes Synthesized on Metallic Substrates," Applied Surface Science, Aug. 1, 2000, pp. 452-456.
EP patent application No. 10781153.1, Supplemental Search Report and Written Opinion mailed Jul. 4, 2013.
Cheng, Mu, et al. "Silicon Nanotube Array/Gold Electrode for Direct Electrochemistry of Cytochrome C," *Journal of Physical Chemistry*, vol. 111, No. 6, Feb. 15, 2007, pp. 1491-1495.
U.S. Appl. No. 13/069,212, Final Office Action mailed Jul. 18, 2014.
U.S. Appl. No. 13/891,035, Final Office Action mailed Jun. 19, 2014.
CN patent application No. 201180022062.7, Office Action mailed Aug. 25, 2014.
JP patent application No. 2013-501400, Office Action mailed Aug. 19, 2014.
CN patent application No. 201080026302.6, Office Action dated Oct. 23, 2013.
U.S. Appl. No. 13/914,491, Office Action dated Dec. 3, 2014.
U.S. Appl. No. 13/427,681, Office Action dated Feb. 6, 2015.
U.S. Appl. No. 13/114,413, Notice to Allowance dated Jan. 22, 2015.
EP Search Report issued in Application No. 12807729.4 on Feb. 5, 2015.
CN patent application No. 201080026302.6, Office Action dated Mar. 23, 2015.
TW patent application No. 100120247, Office Action dated Feb. 9, 2015.
CN patent application No. 201180019460.3, Office Action dated May 6, 2015.
U.S. Appl. No. 13/114,413, Notice of Allowance dated Jun. 24, 2015.
JP patent application No. 2012-556203, Office Action dated Jul. 14, 2015.
IL patent application No. 216100, Office Action dated May 4, 2015.
EP Search Report issued in Application No. 12807729.4 on Jun. 2, 2015.
U.S. Appl. No. 13/914,491, Notice of Allowance dated Jul. 19, 2015.
CN Office Action issued in Application No. 201280038037.2 on Aug. 5, 2015.
TW Office Action issue in Application No. 100138369, dated Dec. 22, 2015.
U.S. Appl. No. 13/914,491, Office Action dated Jan. 8, 2016.
International Search report and Written Opinion dated Aug. 10, 2015, issued in Application No. PCT/US15/30336.
CN Office Action issued in application No. 201080026302.6, dated Nov. 10, 2015.
Huang et al., Fabrication of Silicon Nanowire Arrays with Controlled Diameter, Length, and Density, Adv. Mater., (2007), 19, 744-748.
Examiner's Answer, dated Sep. 28, 2016, issued in U.S. Appl. No. 13/427,681.
CN Office Action issued in application No. 201280038037.2, dated May 26, 2016.
JP Office Action issued in application No. 2014-519238, dated May 31, 2016.
IL patent application No. 216100, Office Action (Notification of Deficiencies Prior to Allowance of Patent Application) dated Jun. 22, 2016.
CN patent application No. 11751259.0, Office Action dated Dec. 12, 2016.
EP Search Report issued in Application No. 12807729.4 on Jan. 11, 2017.
Sun et al, Synthesis of Nickel Mono-Silicide Nanowire by Chemical Vapor Deposition on Nickel Film: Role of Surface Nickel Oxides, Japanese Journal of Applied Physics, vol. 48, No. 4, Apr. 1, 2009, p. 84C138, XP855323364.
CN Office Action issued in Application No. 201280038037.2 dated Feb. 6, 2017.
JP Office Action issued in Application No. 2014-519238 dated Feb. 7, 2017.
CN patent application No. 11751259.0, Extended Search Report dated Mar. 16, 2017.
CN patent application No. 201080023257.9, Second Office Action dated Oct. 21, 2014.
JP patent application No. 2012-513226, Japanese Office Action dated Feb. 10, 2015.
U.S. Appl. No. 13/069,212, Final Office Action dated Feb. 25, 2015.
EP patent application No. 11760076.7, Extended Search Report dated Mar. 9, 2015.
TW patent application No. 100120433 Office Action dated Feb. 9, 2015.
CN patent application No. 201080023257.9, Chinese Office Action dated Jun. 4, 2015.
CN patent application No. 201180022062.7, Office Action dated Jun. 12, 2015.
Israel Office Action dated Aug. 10, 2015, IL patent application No. 216246.
U.S. Appl. No. 13/891,035, Final Office Action dated Apr. 23, 2015.
U.S. Appl. No. 13/891,035, Notice of Allowance dated Aug. 26, 2015.
Zhang, Y., et al., "Pyrolytic Carbon-Coated Silicon/Carbon Nanotube Composites: Promising Application for Li-ion Batteries," Int. J. Nanomanufacturing, vol. 2, Nos. 1/2, 2008, pp. 4-15.
U.S. Pat. No. 2013-501400, Decision of Rejection dated Sep. 1, 2015.
JP patent application No. 2012-513226, Japanese Final Notice of Reasons for Rejection dated Aug. 25, 2015.
KR patent application No. 10-2011-7031121, Notice of Intent to Grant Application, dated Jun. 16, 2015.
U.S. Appl. No. 13/891,035, Supplemental Notice of Allowance dated Sep. 23, 2015.
U.S. Appl. No. 14/952,744, Office Action dated Nov. 25, 2015.
Israel Office Action dated Jan. 20, 2016, IL patent application No. 216246.
TW patent application No. 100120433 Office Action dated Jan. 22, 2016.
U.S. Appl. No. 13/069,212, Final Office Action dated Feb. 22, 2016.
JP application No. 2013-501400, Pre-Trial Examination dated Mar. 29, 2016.
U.S. Appl. No. 13/069,212, Office Action dated May 23, 2016.
U.S. Appl. No. 14/952,744, Office Action dated Sep. 27, 2016.

(56) References Cited

OTHER PUBLICATIONS

JP patent application No. 2016-000227, Office Action dated Oct. 4, 2016.
KR patent application No. 10-2012-7026806 Office Action dated Jan. 18, 2017.
U.S. Appl. No. 13/069,212, Office Action dated Dec. 13, 2016.
JP patent application No. 2013-501400, Office Action dated Feb. 14, 2017.
Cui, et al., Carbon—Silicon Core—Shell Nanowires as High Capacity Electrode for Lithium Ion Batteries, Nano Letters 9(9):3370-4 • Sep. 2009, pp. 3370-3374.
CN patent application No. 201510674597.2, Office Action and Search Report dated Mar. 28, 2017.
JP patent application No. 2016-000227, Office Action dated Mar. 21, 2017.
TW patent application No. 100120433 Office Action dated Mar. 17, 2017.

* cited by examiner

HIGH-CAPACITY ELECTRODES WITH ACTIVE MATERIAL COATINGS ON MULTILAYERED NANOSTRUCTURED TEMPLATES

CROSS-REFERENCE TO RELATED APPLICATIONS

This application claims the benefit under 35 U.S.C. §119 (e) of U.S. Provisional Patent Application No. 61/406,047, entitled "BATTERY ELECTRODE STRUCTURES FOR HIGH MASS LOADINGS OF HIGH CAPACITY ACTIVE MATERIALS" filed on Oct. 22, 2010, which is incorporated herein by reference in its entirety.

This application is also a continuation-in-part of U.S. patent application Ser. No. 13/039,031, entitled "TEMPLATE ELECTRODE STRUCTURES FOR DEPOSITING ACTIVE MATERIALS," filed on Mar. 2, 2011, which is a non-provisional of U.S. Provisional Patent Application No. 61/310,183, entitled "ELECTROCHEMICALLY ACTIVE STRUCTURES CONTAINING SILICIDES," filed on Mar. 3, 2010, which is incorporated herein by reference in its entirety for all purposes.

This application is also a continuation-in-part of U.S. patent application Ser. No. 13/069,212, entitled "INTERCONNECTING ELECTROCHEMICALLY ACTIVE MATERIAL NANOSTRUCTURES," filed on Mar. 22, 2011, which is a non-provisional of U.S. Provisional Patent Application No. 61/316,104, entitled "INTERCONNECTING ACTIVE MATERIAL NANOSTRUCTURES," filed on Mar. 22, 2010, which is incorporated herein by reference in its entirety for all purposes.

This application is also a continuation-in-part of U.S. patent application Ser. No. 13/114,413, entitled "MULTIDIMENSIONAL ELECTROCHEMICALLY ACTIVE STRUCTURES FOR BATTERY ELECTRODES," filed on May 24, 2011, which is a non-provisional of U.S. Provisional Patent Application No. 61/347,614, entitled "MULTIDIMENSIONAL ELECTROCHEMICALLY ACTIVE STRUCTURES FOR BATTERY ELECTRODES," filed on May 24, 2010.

All patent applications listed above are incorporated herein by reference in their entirety for all purposes.

STATEMENT OF GOVERNMENT SUPPORT

The invention described and claimed herein was made with United States Government support under NIST ATP Award No. 70NANB10H006, awarded by the National Institute of Standards and Technology. The United States Government has certain rights in this invention.

BACKGROUND

High capacity electrochemically active materials are very desirable for battery applications. However, these materials exhibit substantial volume changes during battery cycling, e.g., swelling during lithiation and contracting during delithiation. For example, silicon swells as much as 400% during lithiation to its theoretical capacity of about 4200 mAh/g or $Li_{4.4}Si$ structure. Volume changes of this magnitude cause pulverization of active materials structures, losses of electrical connections, and capacity fading.

Providing high capacity materials as nanostructures can address some of these issues. Nanostructures have at least one nanoscale dimension, and swelling-contracting along this dimension tends to be less destructive than along larger sides and dimensions. As such, nanostructures can remain substantially intact during battery cycling. However, integrating multiple nanostructures into battery electrode layers that have adequate active material loadings is difficult. Such integration involves establishing and maintaining electrical interconnections between such nanostructures and current collectors and providing mechanical support to these nanostructures on the current collectors or some other substrates over many cycles. Further, smaller nanostructures often do not provide adequate amounts of high capacity active materials in certain electrode designs. For example, depositing a nanofilm onto a conventional flat substrate does not provide adequate active material loading if the nanofilm is kept thinner than typical fracture limits of high capacity active materials. Furthermore, many processes proposed for fabricating nanostructures are slow and often involve expensive materials. For example, etching silicon nanowires from bulk particles uses silver catalysts and expensive etching solution. Growing long crystalline silicon structures can also be a relative slow process and may involve expensive catalysts, such as gold.

SUMMARY

Provided are battery electrode structures that maintain high mass loadings (i.e., large amounts per unit area) of high capacity active materials in the electrodes without deteriorating their cycling performance. These mass loading levels correspond to capacities per electrode unit area that are suitable for commercial electrodes even though the active materials are kept thin and generally below their fracture limits. A battery electrode structure may include multiple template layers. An initial template layer may include nanostructures attached to a substrate and have a controlled density. This initial layer may be formed using a controlled thickness source material layer provided, for example, on a substantially inert substrate. Additional one or more template layers are then formed over the initial layer resulting in a multilayer template structure with specific characteristics, such as a surface area, thickness, and porosity. The multilayer template structure is then coated with a high capacity active material.

In certain embodiments, an electrode material includes an electronically conductive layer, a layer of first nanostructures positioned on the electronically conductive layer, and a layer of second nanostructures positioned on the layer of the first nanostructures. The first nanostructures include one or more metal silicides. The electrode material also includes a coating of electrode active material that covers at least a portion of the first nanostructures and the second nanostructures. Examples of metal silicides that could be included in the first nanostructures include nickel silicides, cobalt silicides, copper silicides, silver silicides, chromium silicides, titanium silicides, aluminum silicides, zinc silicides, and iron silicides. More specific examples of metal silicides include $Ni_2Si$, $NiSi$, $NiSi_2$, and combinations thereof. The electronically conductive layer may include stainless steel. Examples of electrode active materials include crystalline silicon, amorphous silicon, silicon oxides, silicon oxy-nitrides, tin-containing materials, germanium-containing materials, and carbon-containing materials.

In certain embodiments, the layer of the first nanostructures includes multiple nanowires rooted to the electronically conductive layer. The electrode material may have porosity between about 30% and 50%. The coating of the electrode active material may include multiple layers. At least some of these multiple layers may have different porosities. For example, multiple layers may include an inner layer and an outer layer. The inner layer may have a lower porosity than the outer layer. The multiple layers may include at least sonic layers that have different hydrogen concentrations or, more generally, different compositions. In certain embodiments, at least some of the multiple layers have different morphologies. In certain embodiments, the coating o the electrode active material is positioned between at least a portion of the layer of the first nanostructures and the layer of the second nanostructures. A layer of the second nanostructures may include carbon nanofibers and/or multidimensional metal silicide structures. Multidimensional metal silicide structures may include support structures to which plurality of metal silicide nanowires are attached.

Provided is an electrode assembly including a conductive substrate for conducting electrical current between an electrode active material and battery terminal and an electrode material. The electrode material in turn includes a layer of the first nanostructures attached to the conductive substrate. The first nanostructures include one or more metal silicides. The electrode material also includes a layer of second nanostructures positioned on the layer of the first nanostructures and a coating of the electrode active material that covers at least a portion of the first nanostructures and the second nanostructures. The first and second nanostructures may provide electronic communication between the electrode active material and conductive substrate.

Provided also is an electrochemical including a first electrode, a second electrode, and an electrolyte providing ionic communication between the first electrode and the second electrode. The first electrode may include an electronically conductive layer, a layer of first nanostructures positioned on the electronically conductive layer, a layer of second nanostructures positioned on the layer of the first nanostructures, and a coating of electrode active material that covers at least a portion of the first nanostructures and the second nanostructures. The first nanostructures may include one or more metal silicides.

A method of fabricating an electrode is also provided. The method may involve receiving a substrate having a base material and forming a source material layer having a controlled thickness. The source material layer may include a metal that is different from the base material. The method may proceed with forming multiple template nanostructures having a metal silicide attached to the base material by chemically reacted the metal with a silicon containing precursor. The method may then proceed with forming a coating of an electrochemically active material over the template nanostructures. The electrochemically active material is configured to take in and release lithium ions during cycling. Multiple template nanostructures facilitate conduction of electrical current to and from the electrochemically active material. In certain embodiments, forming the coating of the electrochemically active material involves forming a first portion of the coating using thermal chemical vapor deposition and forming a second portion of the coating using plasma enhanced chemical vapor deposition. The method may also involve controlling porosity of the coating of the electrochemically active material using one or more of the following techniques: doping, etching, ion implantation, and annealing. In certain embodiments, forming the coating of the electrochemically active material involves multistep thermal chemical vapor deposition.

These and other embodiments are described further below with reference to the figures.

DETAILED DESCRIPTION OF EXAMPLE EMBODIMENTS

Figure 1A:
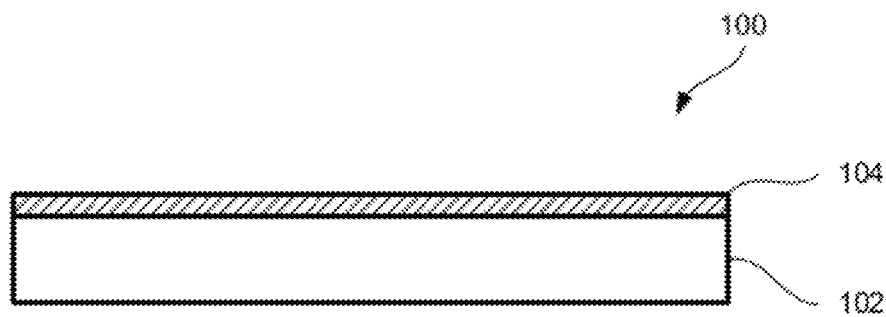
FIGS. 1A-C are schematic representations of an electrode substrate at different stages of template formation, in accordance with certain embodiments.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

High capacity electrochemically active materials can be formed into nanostructures for use in rechargeable batteries. Nanostructures are less likely to deteriorate than larger structures during battery cycling. Specifically, they are less likely to pulverize and/or lose electrical contacts with one another because of lower mechanical stresses built up in the nanostructures during lithiation. Yet, integrating nanostructures into a battery electrode layer that has adequate active material loading may be challenging because of their small sizes and need to establish and maintain many electrical connections within the electrode. For example, it is difficult to mechanically arrange, support, and electrically interconnect many small nanostructures as well as to preserve these arrangements and interconnections over a large number of swelling-contraction cycles. Further, nanoparticles that are only 50-100 nanometers in diameter will have to rely on hundreds and even thousands of particle-to-particle connections and possibly intermediate conductive structures to pass an electrical current in a typical electrode design. Initial connections formed, for example, by direct contacts of the nanoparticle and/or conductive additives are often lost when the nanoparticles swell and then contract. While swelling, the nanoparticles push each other and other components apart. During delithiation, the same nanoparticles shrink, and the original contacts may be lost due to electrode elasticity constraints. This may result in unconnected active particles, which effectively become inactive. Nanofilms have been proposed as alternative nanostructures. They are formed with a relative small thickness (e.g., less than 500 nanometers) to avoid fracturing during cycling. Unfortunately, nanofilms deposited on flat substrates contain only very small amounts of the active material over the surface area of an electrode and therefore are not practical for most battery applications.

High surface area substrates help to increase active material loading while keeping active material structures relatively small. These substrates, when coated with active materials, can yield a higher capacity per unit area (based on the flat electrode surface area) than conventional flat substrates. High surface area substrates may be formed by roughening substrate surface or forming templates on a surface of the initial flat substrate. For example, a flat metallic substrate may be processed to form silicide nanostructures extending from the substrate surface. The addition of the nanostructures substantially increases the overall surface area available for coating. These silicide nanostructures can serve as a high surface area template used for coating active materials. In some embodiments, silicide nanostructures may be shaped as nanowires that have substrate rooted ends or middle portions. The rooted ends may form integral structures with the substrate surface. In some cases, the nanowires may not have a clearly defined morphological boundary at the interface with the substrate. As a result, nanowires may have superior mechanical attachment to the substrate and a low electronic contact resistance.

Some template nanostructures can be difficult to grow above certain dimensions. For example, when forming metal silicide templates, the growth is believed to be limited by diffusion rates of silicon and metals through the respective silicide phases. Only relative short structures may be formed resulting in thin template layers, for example, less than 10-20 micrometers in thickness for nickel silicide nanowires. Such silicide structures do not provide an adequate surface area to support enough active material. If an active material is coated over this template such that the coating thickness does not exceed the fracture limit of the active material, the total amount of active materials per unit area may be not sufficient for a commercially viable electrode.

Furthermore, forming silicide nanostructures on metal surfaces with an excess of source metals, such as forming nickel silicide nanowires on a thick nickel foil, may cause undesirable deposits formed near the bases of the silicide nanostructures. These undesirable deposits may cause an increase in the overall electronic resistance of the electrode and other undesirable effects. Finally, a deposition thickness of many active materials is limited to their fracturing limits, e.g., a few hundred of nanometers for amorphous silicon. These constraints limit electrode design options and use of high capacity active materials in commercial batteries.

Novel template layer structures and fabrication techniques are provided and described herein. These structures allow having higher mass loading of high capacity active materials per electrode unit area without exceeding fracture limits of these active materials. Higher mass loading corresponds to a higher capacity per electrode unit area and, in certain embodiments, to a higher capacity of electrochemical cells. Controlling thickness of the active material coating and keeping it under the fracture limit may result in more robust cycling performance characteristics.

An initial template layer may be formed on a substrate that is relatively inert during template formation. For example, a substrate for forming a template may include a base layer and a source layer. Only a source layer is consumed during template fabrication, while the base layer stays substantially intact. The source layer may have a controlled thickness to control a density and length of the formed template structures. The source layer may be fully consumed during formation of the nanostructure template layer. For example, a layer of nickel metal having a controlled thickness may be used as the template source material. The layer is exposed to a silicon precursor, such as silane, until the layer is fully consumed. In the course of the process, nickel silicide nanostructures are formed. These nickel silicide nanostructures serve as the template layer.

In certain embodiments, an initial template layer is enhanced by forming additional one or more template layers over that initial layer. The resulting structure is referred to herein as a multilayer template structure. Additional layers may be formed using prefabricated structures, such as carbon nanofibers (CNF) and/or multidimensional silicide structures, which are sometimes referred to as "fuzzy balls" or "urchin" structures. Each of these multidimensional silicide structures typically may have a central support structure and multiple metal silicide nanowires attached to the support structure and extending into different directions away from the support structure. This arrangement gives a "fuzzy ball" look to such structures. In certain embodiments, template structures of additional template layers may be formed directly over an initial template layer, which is further described in U.S. patent application Ser. No. 13/039,031, entitled "TEMPLATE ELECTRODE STRUCTURES FOR DEPOSITING ACTIVE MATERIALS," filed on Mar. 2, 2011, which is incorporated herein by reference in its entirety for purposes of describing template structures. Multidimensional silicide structures are described in U.S. patent application Ser. No. 13/114,413, entitled "MULTIDIMENSIONAL ELECTROCHEMICALLY ACTIVE STRUCTURES FOR BATTERY ELECTRODES," filed on May 24, 2011, which is incorporated herein by reference in its entirety for purposes of describing multidimensional silicide structures.

In certain embodiments, cell performance and active material loading can be substantially improved by using various novel active material coating structures. For example, a multi-layered active material coating may be formed on template structures. Various deposition and post-deposition treatment techniques are described below to achieve desired compositions as well as morphological and dimensional structures within these active material coatings.

A typical electrode material or electrode structure may include different layers, which should be distinguished from each other. Specifically, an "active material layer" should be distinguished from a "template layer" and an "electrode layer". A "template layer" is a layer formed by one or more template structures, such as nickel silicide nanowires. An initial template layer is formed over a substrate surface. In embodiments involving silicide nanowires, this initial layer may be about 10-20 micrometers thick. Additional template layers may be formed over the initial template layer to form a multilayer template structure. A thickness of the multilayer template structure equals a sum of thicknesses of individual template layers.

An "active material layer" is a thin layer of an active electrode material, such as amorphous silicon, that is formed over the template layer structures. The active material layer is often referred to as an active material coating because it is often formed by coating template structured with an active material. The thickness of the active material layer/coating is typically chosen to be less than material's fracture limits for given lithiation levels. The fracture limit may be further adjusted by varying porosity and other parameters of the active material coating.

Multiple template layers may be stacked one on top of the other and these layers are generally parallel to the substrate surface. On the other hand, the active material coating follows contours of template structures. In certain embodiments, an active material coating layers may be considered a shell surrounding template nanostructures within the template layer. In certain embodiments, an active material coating may have has multiple layers forming a multilayer active material coating or structure.

An "electrode layer" is commonly used in the art to describe a collective structure formed on one or both side of a conductive substrate. This structure includes an active material and various other components that may be added to provide mechanical support and electrical conductivity within the electrode layer. In certain embodiments, the electrode layer includes a combination of a template layer and an active material coating.

Figure 1B:
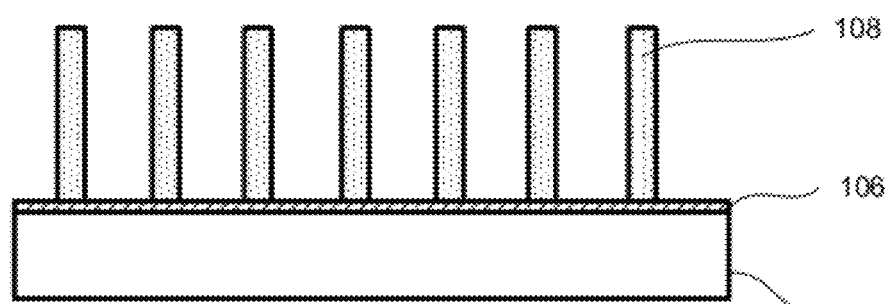

FIGS. 1A-B are schematic representations of a template at different stages of its formation, in accordance with certain embodiments. FIG. 1A illustrates an initial stage where substrate 100 has base layer 102 and source layer 104. As further described below with reference to FIG. 4A, a template formation process may start with depositing a source layer on a base layer. In certain embodiments, base layer 102 contains little or no source material that could be used to form template structures. Instead, base layer 102 may include an inert material, at least on its top surface. In these embodiments, base layer 102 needs be inert only at process conditions used during template formation. For example, a stainless steel foil may remain substantially inert during formation of nickel silicide nanowires from a nickel layer deposited on the stainless steel foil. However, further heating this stainless steel foil may result in formation of iron silicides and other byproducts. As such, process conditions may be specifically controlled to avoid undesirable reactions and interactions with base layer 102 as further explained in the context of FIG. 4A. In other embodiments, a substrate does not have distinctive base and source layers and the same material is used both as a base and a source, for example, of metal during silicides formation.

Base layer 102 may be made from various conductive materials and serve as a current collector for active materials. Some example of base layer materials include copper, copper coated with metal oxides, stainless steel, titanium, aluminum, nickel, chromium, tungsten, metal nitrides, metal carbides, carbon, carbon fiber, graphite, graphene, carbon mesh, conductive polymers, or combinations of above including multi-layer structures. The base layer material may be formed as a foil, film, mesh, foam, laminate, wires, tubes, particles, multi-layer structure, or any other suitable configuration. In certain embodiments, a base material is a metallic foil with a thickness of between about 1 micrometer and 50 micrometers or, more specifically between about 5 micrometers and 30 micrometers.

Examples of materials for source layer 104 include any of a number of materials that form silicide nanostructures. Such materials include nickel, cobalt, copper, silver, chromium, titanium, iron, zinc, aluminum, tin, and their combinations. Examples of some alloys include nickel/phosphorus, nickel/tungsten, nickel/chromium, nickel/cobalt, nickel/iron, and nickel/molybdenum. Source layer 104 may be at least about 10 nanometers thick or, more specifically, at least about 100 nanometers thick. In more specific embodiments, a nickel source layer is between about 100 nanometers and 300 nanometers thick. In another specific embodiment, a nickel phosphate source layer is between 300 nanometers and 10 micrometers. In some exemplary embodiments, the nickel phosphate layer is about 500 nanometers thick, or about 1.5 micrometers thick, or about 8 micrometers thick. A source layer may also be made from NiFe, NiW, and NiMo alloys with a thickness of between about 0.5 micrometers and 10 micrometers.

A specific thickness of source layer 104 may cause specific characteristics of the resulting template layer. For example, it has been found that thicker source layers may lead to formation of denser and/or longer silicide structures. For example, two nickel layers having different thicknesses were exposed to silane at typical nickel silicide formation conditions and then tested for weight gain. A sample with a 100 nanometers layer showed 0.04 milligrams per centimeter square weight gain, while the one with a 300 nanometers layer showed 0.1 milligrams per centimeter square weight gain. These experimental results demonstrate that some template characteristics can be controlled by forming a source layer having a specific thickness. Further, these characteristics can be controlled to affect the surface area available for coating and, thus, the resulting mass loading of the active material layers.

In certain embodiments, a substrate may have an intermediate protective layer formed between the base and source layers (not shown). This protective layer may be made from inert materials and can protect the base layer from being exposed to reactive species, e.g., silane. When a protective layer is used, it is possible to use material that can react with silane if they were in direct contact for the base. Various examples of intermediate layers are described in U.S. patent application Ser. No. 12/944,576, entitled "INTERMEDIATE LAYERS FOR ELECTRODE FABRICATION," filed on Nov. 11, 2010, which is incorporated herein by reference for purposes of describing intermediate layers. In addition to or instead of providing protective properties, an intermediate layer may be used to enhance adhesion between the template structures and the base layer. Other intermediate layers that offer other desirable characteristic can also be used.

In certain embodiments, a source material is provided in a form of particles or other discrete structures. These structures are still described as source layer 104 formed on a surface of the base layer. These discrete structures may be provided as a layer having a thickness of at least about 10 nanometers or, more specifically, between about 10 nanometers and 500 nanometers. In certain embodiments, precursor particles are used to control the porosity of the resulting electrode layer and have diameters of between about 1 and 3 micrometers.

FIG. 1B illustrates an intermediate stage of template formation with an intermediate template structure 108 formed over a residual source layer 106. Some of the initial source material has been consumed to form intermediate template structures 108. Therefore, residual source layer 106 shown in FIG. 1B is typically thinner than initial source layer 104 shown in FIG. 1A. At this stage, there may be still some remaining source material to support further growth of intermediate template structures 108. In certain embodiments, residual layer 106 may include reaction products of source materials forming an alloy, which cause some swelling. Therefore, in these embodiments, residual layer 106 may sometimes be thicker than initial source layer 104. A specific example would be the formation of a very metal rich silicide phase, such as nickel silicide or copper silicide, where the residual layer may expand as it alloys with the silicon. Proper selection of the residual layer composition and processing conditions will positively affect the performance and the volumetric energy density of the electrode.

Figure 1C:
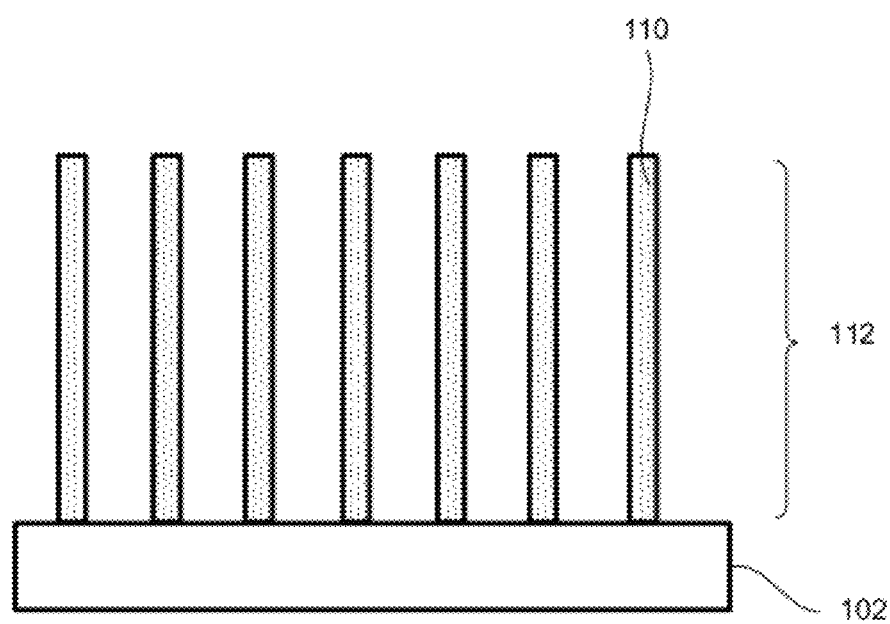

FIG. 1C illustrates a final stage of the template formation operation where template structures 110 are finally formed. In the depicted embodiment, template structures 110 have their ends rooted to base layer 102. Template structures 110 may be between about 5 nanometers and 100 nanometers in diameter (i.e., prior to depositing active material) or, more specifically, between about 10 nanometers and 50 nanometers. Further, template structures 110 may be between about 1 micrometer and 100 micrometers long or, more specifically, between about 2 micrometers and 25 micrometers long. In the depicted embodiment where template structures 110 extend substantially perpendicular to the flat surface of the base layer, this length corresponds to a thickness of a template layer 112. Template layer 112 may have a porosity of at least about 50% or, more particularly, at least about 75%, or even at least about 90%. The porosity of template layer 112 that does not include any active material should be distinguished from a porosity of the active layer (i.e., a thin layer of active material formed on a surface of template structures 110) or a porosity of the electrode layer.

In the depicted embodiment in FIG. 1C, residual source layer 106 has been substantially consumed. The thickness of initial source layer 104 may be specifically selected such that most or all of the source material is eventually consumed during template formation. This approach may eliminate formation of undesirable materials, such as metal silicides, at the interface with the base layer. For example, if a brittle silicide phase is formed on the surface, then various stresses generated before, during, or even after active material deposition may lead to fracture of that silicide phase. Some phases may also have poor adhesion to the substrate below or the active material on top. Another example demonstrates some drawback of having a thick (e.g., at least about 500 nanometers) nickel film. Nickel is known to diffuse relatively fast in silicon structures. If some residual nickel is left at the interface, it may react with silicon at high temperatures during silicon deposition, and "consume" a portion of silicon that is meant to be active material. This may in turn cause an unbalanced electrochemical cell (i.e., inadequate amounts of the negative active material) and possibly overcharge. Furthermore, this initial thickness may be selected to achieve certain density and length of template structures as described above.

Generally, the template material is highly electronically conductive and mechanically stable in the face of stresses experienced from expansion and contraction of active materials during cycling. Examples of suitable template materials include metal silicides (e.g., copper silicides, nickel silicides, aluminum silicides), carbon, certain metal or semiconductor oxides (e.g. zinc oxide, tin oxide, indium oxide, cadmium oxide, aluminum oxide, titania/titanium dioxide, silicon oxides), and certain metals (copper, nickel, aluminum). In particular embodiments, template structures are formed into nanowires and include silicides. Silicide nanowires may have a variable material composition along their lengths, i.e., higher source material concentrations at the rooted (proximal) ends where more source material is available than near the free (distal) ends of the nanowires. Depending on a source material type, this variability may be reflected in different morphological and stoichiometric phases of silicides. For example, nickel silicide nanowires may include one, two, or all three phases of nickel silicide, i.e., $Ni_2Si$, $NiSi$, and $NiSi_2$. It is believed that higher nickel content phases form stronger bonds with nickel metal. Therefore, this variability may provide relatively strong adhesion of nickel silicide nanowires to the base layer and reduce the contact resistance. The conductivity and lithium irreversibility of these different nickel silicide phases also varies.

Cone shaped nanowires may also result from greater availability of the metal near the substrate/support rooted ends of the nanowires. In certain embodiments, an average diameter near the substrate/support rooted ends is at least about twice that near the free end. In other words, nanowires' bases may be large enough even to touch one another at the proximal ends on the surface of the substrate, but the distal tips are free and unconnected because of a decrease in diameter along the structure form the base to the tip. In more specific embodiments, a ratio of diameters between the proximal and distal nanowire ends is at least about 4 or, more particularly, at least about 10. Wider bases may help to maintain adhesion to the substrate.

Figure 1D:
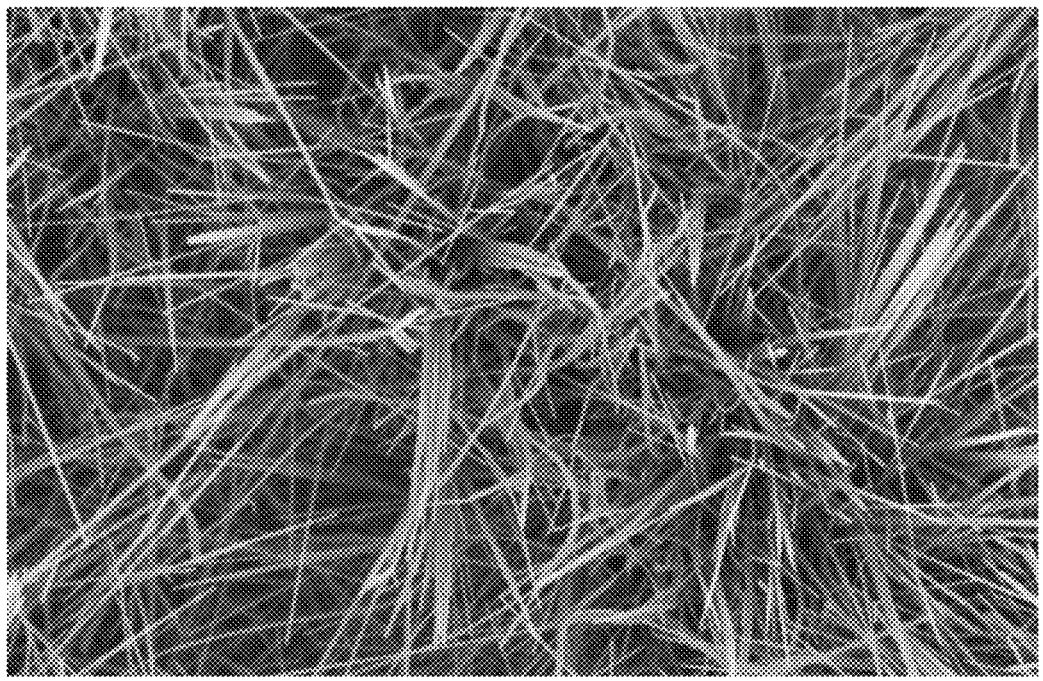
FIG. 1D is a Scanning Electron Microscope image of a nanostructured template containing nickel silicide nanowires.

FIG. 1D is a Scanning Electron Microscope image of a nanostructured template containing nickel silicide nanowires. These nanowires were deposited directly on a hard rolled nickel foil available from Carl Schlenk AG Company in Roth, Germany. The foil was first oxidized for one minute at 300° C. in a process chamber containing air at a pressure of 50 Torr. The foil was then heated to 450° C. and a process gas containing 1% silane by volume was introduced into the chamber for ten minutes. Resulting silicide nanowires were about 10-50 nanometers in diameters and about 1-30 micrometers in length. A density of nanowires was between about 10-70%. As it can be seen from the SEM image in FIG. 1D, the nanowires form a template with a relatively large surface area. The substrate carrying this template was punched into discs that were approximately 15 millimeters in diameter to construct coin cells.

Figure 1E:
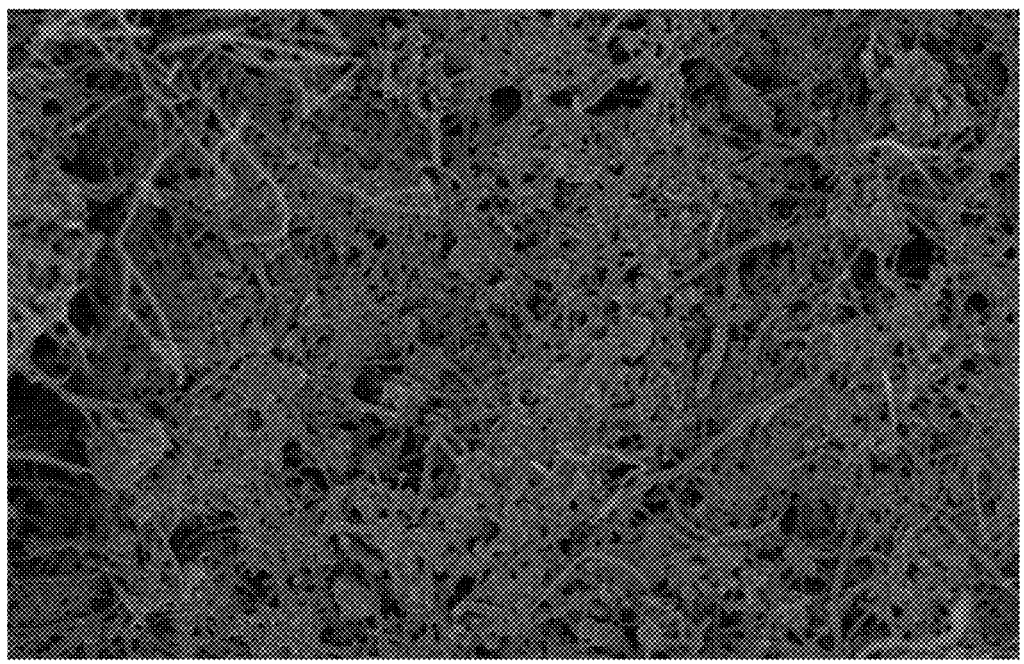
FIG. 1E is a Scanning Electron Microscope image of a nanostructured template containing nickel silicide nanowires with carbon nanofibers (CNF) deposited over the nickel silicide nanowires.

In certain embodiments, an initial nanostructure template layer formed on a substrate does not provide a sufficient surface area and/or thickness for deposition of the active material desired. As explained above, a certain minimal surface area of a template may be needed per planar electrode surface area to achieve adequate active material loading. To provide additional surface area, one or more additional template layers may be provided over the initial template layer to form a multilayer template structure. For example, an initial silicide template may be coated with a layer of carbon nanofibers (CNF). FIG. 1E is a Scanning Electron Microscope image of a nanostructured template containing nickel silicide nanowires with carbon nanofibers (CNF) deposited over the nickel silicide nanowires.

Figure 1F:
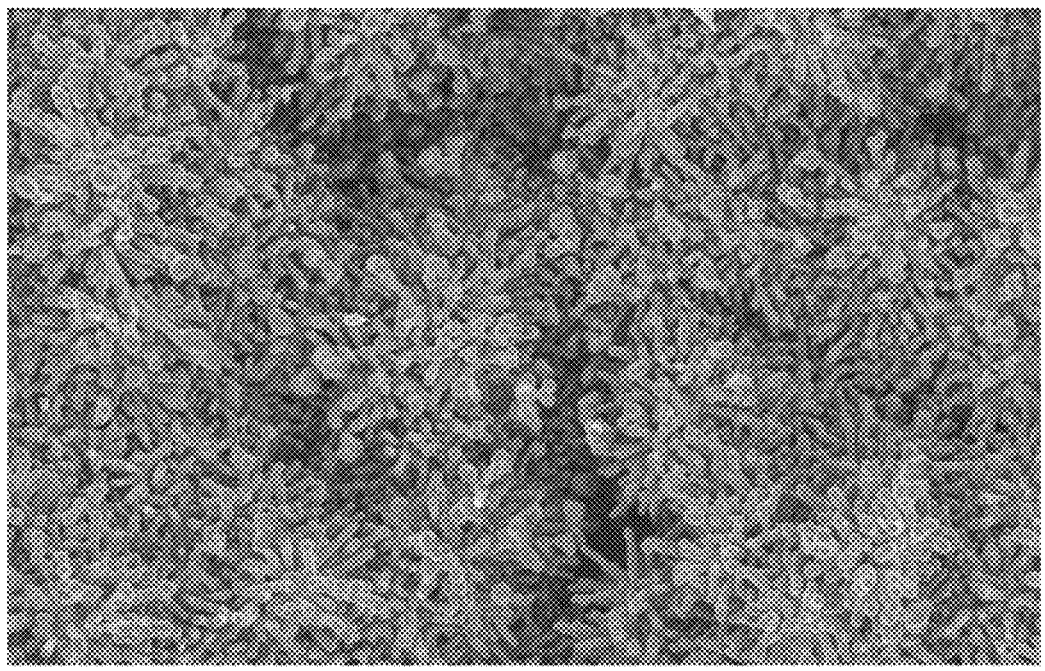
FIG. 1F is a Scanning Electron Microscope image of a nanostructured template containing nickel silicide nanowires with a layer of multidimensional nickel silicide structures deposited over the nickel silicide nanowires.

In certain embodiments, an available surface area of the initial silicide template is increased by providing a second layer of structures that form a second template layer. These structures of the second template layer may have characteristics similar to structures in the initial layer, e.g., both may be electronically conductive and form porous template layers available for active material coating. In specific embodiments, the second template layer includes fibers or linear nanostructures. Examples of such structures include carbon fibers, carbon nanotubes, and silicide nanowires. In other embodiments, multidimensional nanostructures may be provided in one or more additional template layers. One example of such structures has a central core to which multiple metal silicide nanowires are attached forming "fuzzy balls" or "snowballs" like structures. In this example, metal silicides nanowires extend in different directions away from the central core. FIG. 1F is a Scanning Electron Microscope image of a nanostructured template containing nickel silicide nanowires and a layer of nickel silicide fuzzy ball structures over the nickel silicide nanowires.

Structures of additional template layers may be made of the same materials as the initial layer, e.g., silicides, or made be made from different materials, e.g., carbon containing materials, different silicides. A multilayer template structure may be at least about 10 nanometers thick or, more particularly, at least 50 nanometers thick or even at least 100 nanometers thick. Additional template layers may be deposited after the initial layer is coated with an active material. In another arrangement, the additional template layers are deposited before the initial layer is coated with an active material, and subsequently the two-layer template is coated with the active material. Various operation sequences are further described below with reference to FIG. 4A.

Template structures can provide mechanical support and/or electrical connection to an active material coating. Having a much higher surface area in comparison to a flat substrate, a nanostructure template allows forming a thin active material coating while still providing a sufficient amount of active material per electrode unit area (the planar surface of the electrode). An active material coating generally has a thickness below the fracture limit of the active material used and morphological structure of the active material. For example, a thickness of an amorphous silicon coating may be less than about 300 nanometers or, more specifically, less than about 100 nanometers. However, various new structures as well as deposition and treatment techniques described herein that change morphological characteristics of the active material coating allow increasing the coating thickness above typical fracture limit values. In one example, a multilayer active material coating may be formed where each layer has a different composition, physical and/or morphological structure. In a specific embodiment, a multilayer active material coating includes inner and outer amorphous silicon layers. The inner layer has a lower porosity than an outer layer.

Examples of negative electrochemically active materials that can be deposited over a template include, but are not limited to, various silicon containing materials (e.g., crystalline silicon, amorphous silicon, other silicides, silicon oxides, sub-oxides, and oxy-nitrides). Other examples of negative electrochemically active materials that can be used include tin-containing materials (e.g., tin, tin oxide), germanium, carbon-containing materials, a variety of metal hydrides (e.g., $MgH_2$), silicides, phosphides, and nitrides. Still other examples include carbon-silicon combinations (e.g., carbon-coated silicon, silicon-coated carbon, carbon doped with silicon, silicon doped with carbon, and alloys including carbon and silicon), carbon-germanium combinations (e.g., carbon-coated germanium, germanium-coated carbon, carbon doped with germanium, and germanium doped with carbon), and carbon-tin combinations (e.g., carbon-coated tin, tin-coated carbon, carbon doped with tin, and tin doped with carbon). High capacity active materials are generally defined as active materials with theoretical lithiation capacities of at least about 700 mAh/g. Examples of positive electrochemically active materials that can serve as coatings include various lithium metal oxides (e.g., $LiCoO_2$, $LiFePO_4$, $LiMnO_2$, $LiNiO_2$, $LiMn_2O_4$, $LiCoPO_4$, $LiNi_{1/3}Co_{1/3}Mn_{1/3}O_2$, $LiNi_xCo_yAl_zO2$, $LiFe_2(SO4)_3$), carbon fluoride, metal fluorides such as iron fluoride ($FeF_3$), metal oxide, sulfur, and combination thereof. Doped and non-stoichiometric variations of these positive and negative active materials may be used as well. Examples of dopant includes elements from the groups III and V of the periodic table (e.g., boron, aluminum, gallium, indium, thallium, phosphorous, arsenic, antimony, and bismuth) as well as other appropriate dopants (e.g., sulfur and selenium).

Figure 2A:
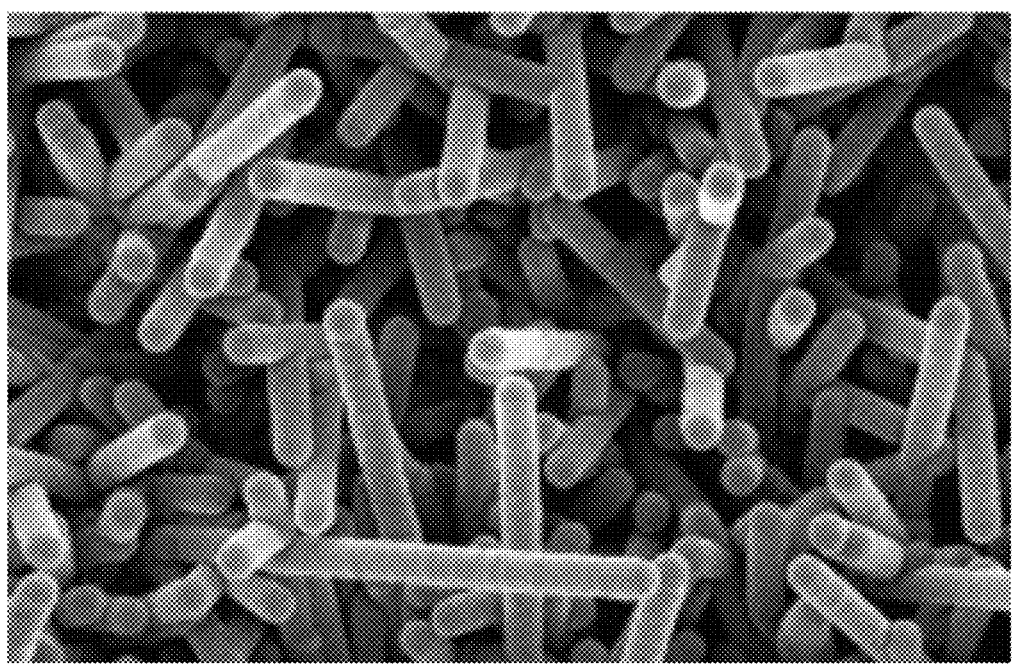
FIGS. 2A-2C are Scanning Electron Microscope images of three electrode layers having different porosities.
Figure 2B:
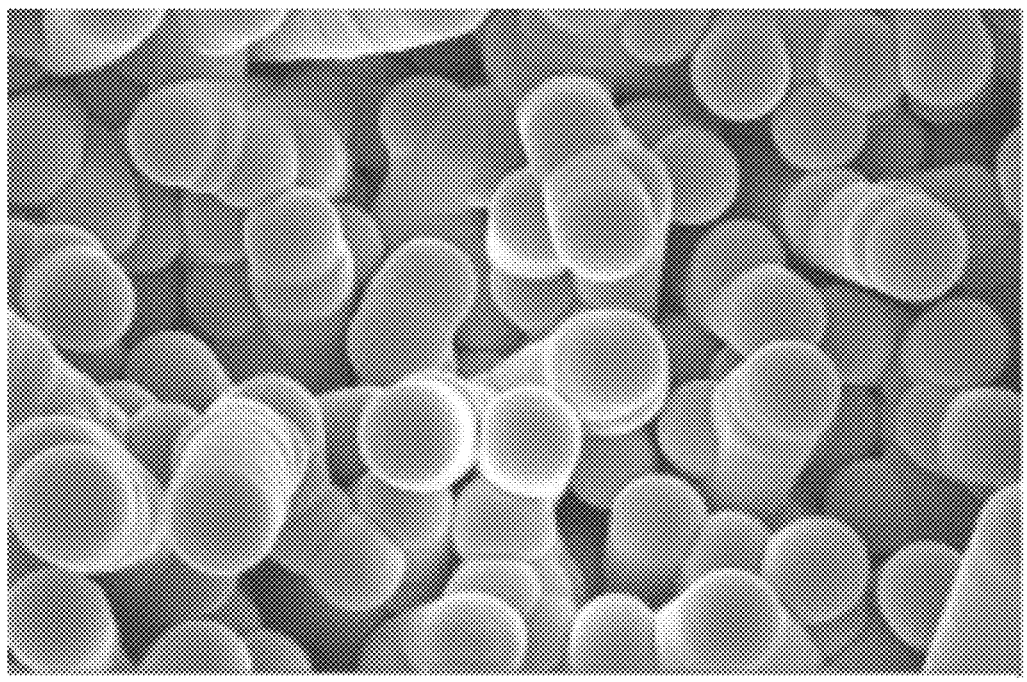
Figure 2C:
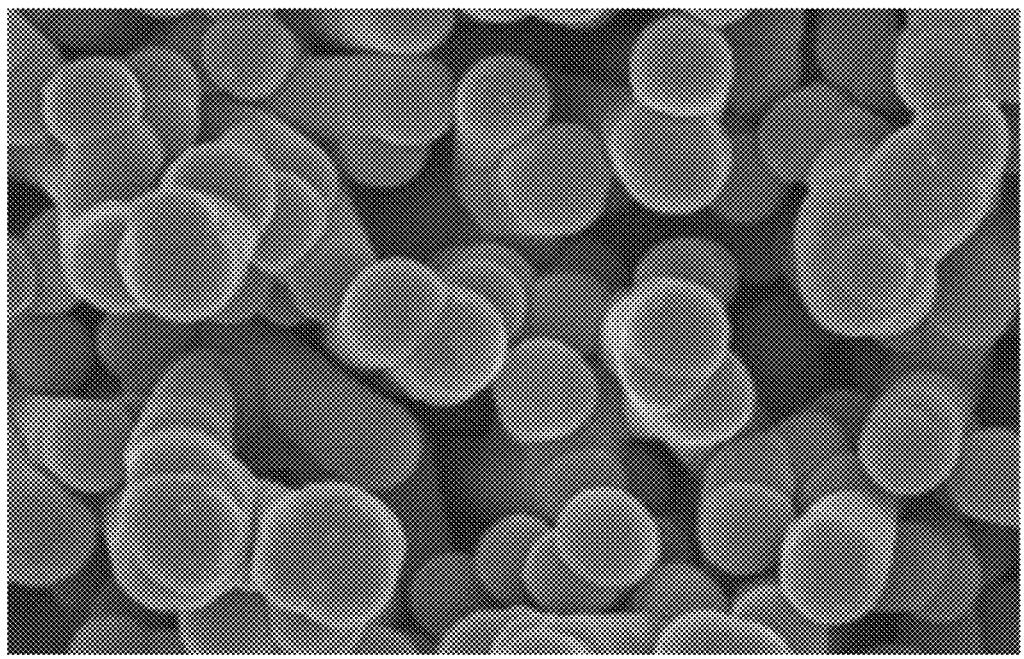

Coating an active material over template structures forms an electrode or, more specifically, an electrode layer. As mentioned above, an electrode layer typically has a thickness comparable to that of the over template layer, which may itself include multiple template layers. The porosity of the electrode layer is generally lower than the porosity of the corresponding overall template layer because the active material occupies some void space in between template structures. The electrode layer porosity generally depends on the composition and thickness of the active material coating as well as cycling characteristics of the cell, e.g., its depths of charge and discharge. It has been found that a suitable porosity of the electrode layer having an amorphous silicon coating is between about 20% and 80% or, more specifically, between about 30% and 60%. These porosity ranges provide both an adequate active material loading and space for active material swelling and ionic mobility. FIGS. 2A-2C are Scanning Electron Microscope (SEM) images of three different electrode layers having different porosities in the 30% and 50% range.

An active material coating may be itself a porous structure, typically having internal voids of much smaller dimension than those associated with the porosity of the overall, two-layer template nanostructures. The electrode layer porosity values recited above do not take into account the porosity of the active material coating. The experimental data suggests that higher active material porosity, i.e., an internal porosity of the active material coating, as well other associated factors result in cells with better cycling performance. In certain embodiments, the porosity within the active material coating is controlled to achieve a desired cell performance.

Figure 3A:
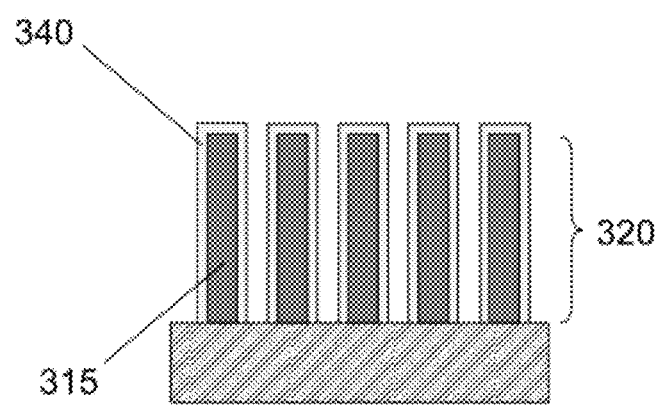
FIG. 3A is a schematic representation of an electrode layer containing a single-layer template coated with a high capacity active material, in accordance with certain embodiments.
Figure 3B:
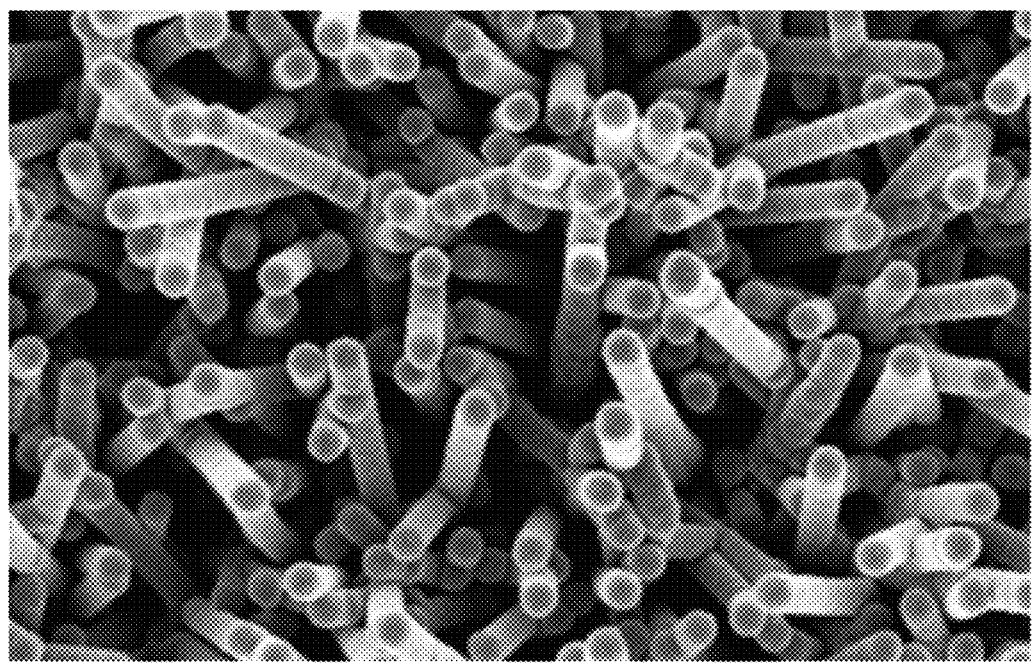
FIG. 3B is a Scanning Electron Microscope image of an electrode layer containing a single-layer nickel silicide template coated with amorphous silicon.

An active material may be deposited directly onto an initial single layer template. FIG. 3A is a schematic representation of an electrode layer containing a number of nanostructures 315 that make up a single-layer template 320. Template 320 is coated with a high capacity active material 340. Sometimes, such initial template layer 320 provides an adequate surface and/or thickness for deposition of high capacity active material 340. For example, high rate battery applications generally use thinner electrodes for their high electronic and ionic conductivities needed to generate and draw high electrical currents. In one arrangement, areal mass density of high capacity active material is between about 1.5 and 4.5 milligram per centimeter square. Such densities translate into an overall thickness of the active material coated template to between about 10 micrometers and 40 micrometers. FIG. 3B is a Scanning Electron Microscope image of an electrode layer containing a single-layer nickel silicide template coated with amorphous silicon.

Figure 3C:
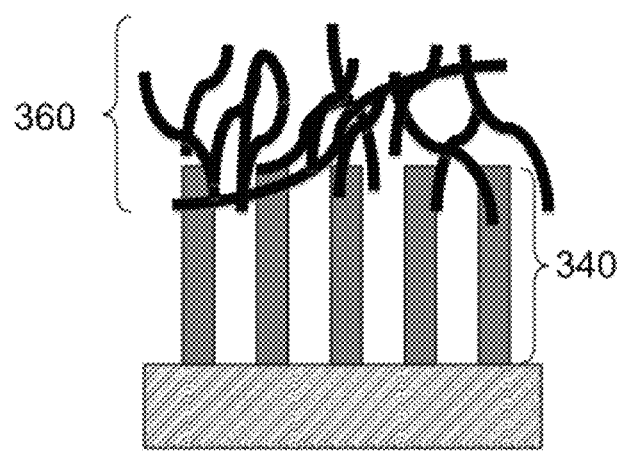
FIG. 3C is a schematic representation of an electrode layer containing a multilayer template formed by a single-layered template and carbon nanofibers (CNF), in accordance with certain embodiments.
Figure 3D:
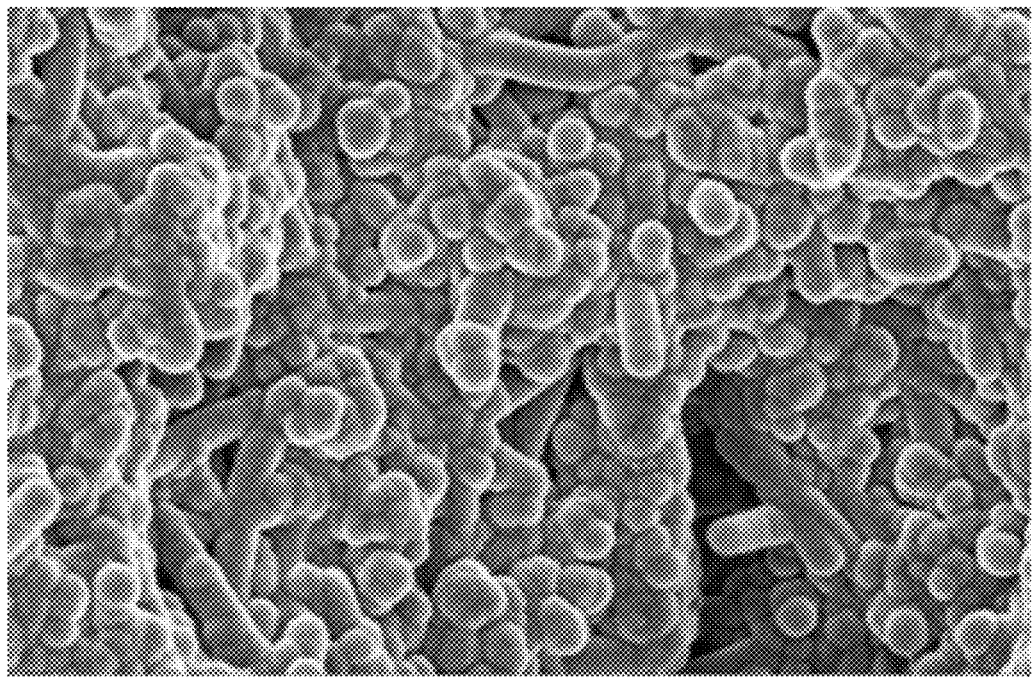
FIG. 3D is a Scanning Electron Microscope image of an electrode layer containing a multilayer template formed by a nickel silicide template and carbon nanofibers (CNF) and coated with amorphous silicon.

In certain embodiments, an initial template layer formed on a substrate does not provide a sufficient surface area for deposition of a desired amount of active material and additional template layers are formed over the initial template layer. Examples of materials that may be employed to produce these additional layers include carbon nanofibers (CNF) and multidimensional silicide structures. FIG. 3C is a schematic representation of an electrode layer containing a multilayer template formed by a first layer 340 of nanostructured silicide template and a second template layer 360 of carbon nanofibers (CNF). Both template layers are coated with a high capacity active. For clarity, an active material coating is not shown in FIG. 3C. The active material coating may be performed sequentially, after each template layer is formed or in one step after all template layers are formed. FIG. 3D is a Scanning Electron Microscope image of an electrode layer containing a multilayer template formed by a nickel silicide template and carbon nanofibers (CNF) and coated with amorphous silicon.

Figure 3E:
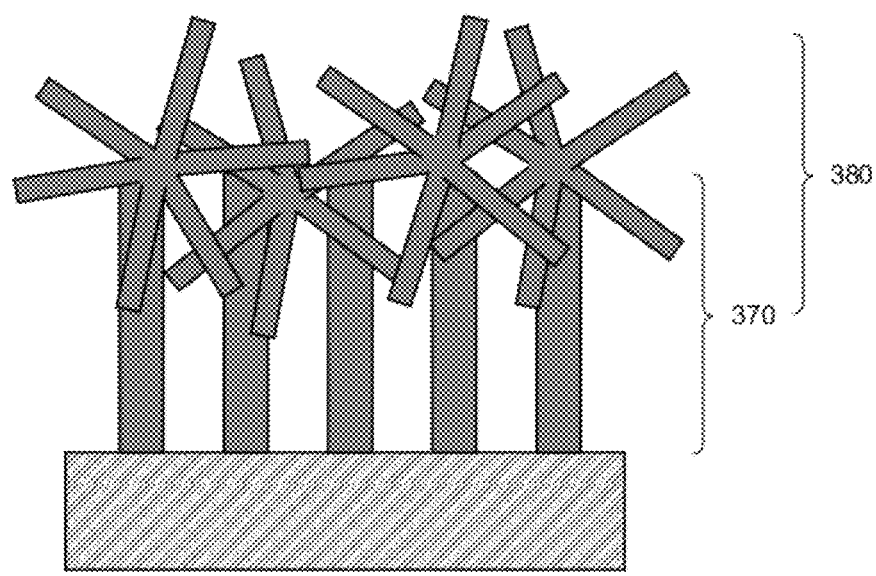
FIG. 3E is a schematic representation of an electrode layer containing a multilayer template formed by a single-layered template and multidimensional silicide structures ("fuzzy balls"), in accordance with certain embodiments.

FIG. 3E is a schematic representation of an electrode layer containing a multilayer template formed from a initial template layer 370 of silicide nanowires and an additional template layer 380 of multidimensional silicide structures. Both template layers are coated with a high capacity active material. For clarity and simplicity, an active material coating is not shown in FIG. 3E. The multidimensional silicide structures may be used to form an electrode with any thickness, for example, continuously deposited over initial template layer 370 until the desirable characteristics are not met. Additional template layer 380 helps to thicken the overall template beyond the lengths of original template structures. There are generally no upper thickness limits for electrode layers fabricated from multiple template layers. This feature allows one to form battery electrode layers with large active material masses per unit area and, therefore, very high capacities per unit area. Multilayer template structures may be stacked up to any thickness as desired for capacity and other battery performance parameters (e.g., cycling rate). For example, it is useful to use thicker electrode layers for high capacity applications, while it is also useful to use thinner more conductive battery electrode layers for high cycling rates (high charge and/or discharge currents).

Various combinations of template layers may be employed, where the individual layers are made from various different materials and/or nanostructure morphologies. Examples of suitable materials for the template include silicides, carbon (fullerene or otherwise), nitrides, carbides, etc. Almost any material that can be formed into an appropriate nanostructure and does not aggressively consume silicon (or other corresponding active material coatings) at temperatures up to about 500° C. or 600° C. can be used as a template material. In some arrangements, the template material is electronically conductive. Examples of suitable template nanostructures include nanowires, fuzzy balls, nanofibers, nanotubes, spheres, cones, rods, wires, arcs, saddles, flakes, ellipsoids, spikes, caterpillar structures, etc.

Figure 3F:
FIG. 3F is a Scanning Electron Microscope image of an electrode layer containing a multilayer template formed by a nickel silicide template and multidimensional nickel silicide structures and coated with amorphous silicon.

Second layer template structures can be bound to the substrate or lower layer template structures using a polymeric binder and/or active material coating. For example, if an active material coating is deposited after the second layer template has been added, the active material itself can join the template layers together. These binding methods are further described in U.S. patent application Ser. No. 13/039,031, entitled "TEMPLATE ELECTRODE STRUCTURES FOR DEPOSITING ACTIVE MATERIALS", filed Mar. 2, 2011, which is incorporated herein by reference for purposes of describing binding methods. FIG. 3F is a Scanning Electron Microscope image of an electrode layer containing a multilayer template formed by a nickel silicide template and nickel silicide multidimensional structures and coated with amorphous silicon.

Figure 4A:
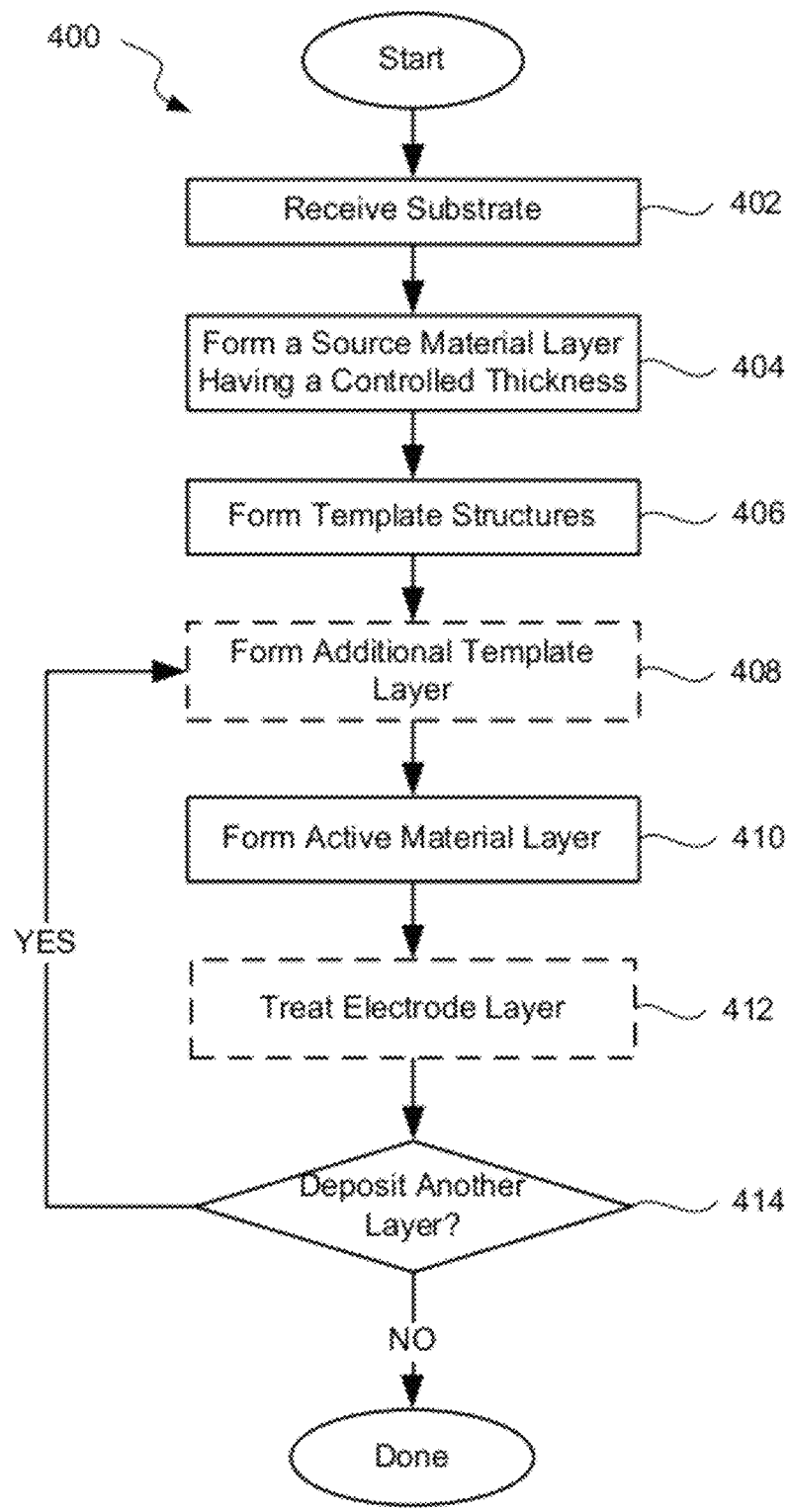
FIG. 4A is a process flowchart corresponding to a method of fabricating a battery electrode layer, in accordance with certain embodiments.

FIG. 4A is a process flowchart corresponding to method 400 for fabricating an electrode layer, in accordance with certain embodiments. Method 400 may start with receiving a substrate having a base layer during operation 402. Various substrate examples are described above. Method 400 may proceed with operation 404 during which a source layer having a controlled thickness is formed on the substrate. Examples of techniques that may be employed during operation include physical vapor deposition (PVD), chemical vapor deposition (CVD), or other technique suitable for producing a uniform, adherent layer of controlled thickness. Various source layer examples are described above. In specific embodiments, a layer of nickel having a thickness of between about 100 nanometers and 500 nanometers is deposited on one or both sides of a stainless steel or tungsten foil. The foil may be between about 5 micrometers and 50 micrometers thick. Other examples of techniques for depositing a source layer include spin-coating a nickel containing sol-gel solution layer having a thickness of between about 100 nanometers and 10 micrometers onto a support foil or a Langmuir-Blodgett method for self-assembling nickel nanoparticles and/or nanowires on a foil.

Operation 404 may also involve treating a source layer surface, for example, to increase its surface roughness and/or to change its surface compositions. Examples of treatment techniques include introducing silicide precursors into the surfaces (e.g., silicon, metal, and/or catalyst containing materials), chemically modifying the surfaces (e.g., forming oxides, nitrides, carbides, initial silicide structures, and treatments with various oxidizing and reducing agents), and physically modifying the surfaces (e.g., increasing surface roughness with laser ablation and/or plasma treatment). Other examples include changing grain orientation, annealing, sonication, doping, and ion implantation. A modified surface of the source layer may enhance formation of the template structures during operation 406.

In certain embodiments, a source layer is oxidized at a temperature of between about 150° C. and 500° C. (more specifically around 250° C.) for a period of between about 0.1 minutes and 10 minutes or, more specifically, around one minute, in a gas stream containing oxygen or other suitable oxidant. It has been found that some oxidation helps roughening the surface and helps initial formation of nickel silicide structures. Without being restricted to any particular theory, it is believed that rough oxide edges may serve as nucleation sites during silicide formation. Further, the oxide may act as a mask to allow nucleation only at the pores. Another function of an oxide may be to regulate the diffusion rate of the metal to the reaction site. It has been also found that excessive oxidation may be detrimental to silicide formation. As such, oxidation conditions may be optimized for each metal containing material and structures containing these materials.

Method 400 may proceed with formation of template structures during operation 406, e.g., using CVD. For example, a process gas that includes a silicon containing precursor (e.g., silane) may be flown into a CVD chamber. In certain embodiments, the volumetric concentration of silane in the process gas is less than about 10%, or more specifically less than about 5%, or even less than about 1%. In particular embodiments, the concentration of silane is about 1%. A process gas may also include one or more carrier gases, such as argon, nitrogen, helium, hydrogen, oxygen (although typically not with silane), carbon dioxide, and methane. The gas and/or substrate may be maintained at a temperature of between about 350° C. and 500° C. or, more specifically, between about 425° C. and 475° C. The duration of deposition may be between about 1 minute and 30 minutes or, more specifically between about 5 minutes and 15 minutes. In embodiments employing non-silicide nanostructures, appropriate adjustments to the gas phase precursor and other process conditions may be employed.

In specific embodiments, process conditions are varied during operation 406. For example, during formation of silicide structures, silane may be introduced initially at a relatively high concentration in order to promote nucleation and then reduced when, e.g., further silicide formation is limited by source metal diffusion from the rooted ends of the structures towards the growing tips. Further, the process temperature may be kept low initially and then increased in order to promote such metal diffusion. In general, process conditions may be varied to control physical (e.g., length, diameter, shape, orientation, areal density) and morphological (e.g., stoichiometric phases to ensure high conductivity of the silicide, for example, distribution along the length, crystalline/amorphous) properties of the formed template structures. Other process conditions that could be varied during operation 406 include composition of the gas mixture (in addition to variable silane concentration described above), various flow rates and patterns, and/or a chamber pressure. If a PECVD (plasma-enhanced chemical vapor deposition) technique is used, power output and frequencies of plasma generators can be varied as well. CVD may also be used.

Method 400 may proceed with forming of an additional template layer during operation 408. In this operation, a single-layer template is transformed into a multilayer template structure. For example, as mentioned, an initial silicide template may be coated with a layer of carbon nanofibers (CNF). In another embodiment, an initial silicide template is coated with a layer of multidimensional silicide structures, such as fuzzy balls. CNF or multidimensional silicide structures may be suspended in a liquid to form slurry and then coated over the initial layer using a "doctor blade" technique or a spraying technique followed by drying. It should be noted that additional template layers may be formed either before or after the initial template layer is coated with an active material as further described in the context of decision block 414.

Method 400 then proceeds with forming an active material coating over a single-layered or multi-layered template structure during operation 410. Deposition of the active material coating may involve CVD, PVD, electroplating, electroless plating, or solution deposition. An example of a PECVD technique will now be described in more detail. A template layer provided into the chamber and/or the process gas are heated to between about 200° C. and 400° C. or, more specifically, between about 250° C. and 350° C. The gas delivered into the chamber can include a silicon containing precursor (e.g., silane) and one or more carrier gases (e.g., argon, nitrogen, helium, hydrogen, carbon dioxide, and methane). In a specific example, a concentration of silane in helium is between about 5% and 20%, or more specifically between about 8% and 15%. The gas may also include a dopant containing material, such as phosphine. The RF power may be delivered at between about 10 W and 1000 W, which generally depends on the size of the chamber and other factors.

Method 400 may then proceed with an optional post-deposition treatment during operation 412. Examples of post-deposition treatment techniques include chemical etching, annealing, and coating. In certain embodiments, a coating of carbon-containing materials is deposited over a high capacity active material. In another embodiment, a coating of amorphous silicon deposited in 410 is chemically etched to introduce pores into the active material coating. In certain embodiments, a solid reaction phase technique or a liquid phase deposition technique is used. For example, a liquid-containing active material species may deposited onto the template and then physically or chemically converted into a solid active material. In specific embodiments, a liquid-containing tetraethyl orthosilicate (TEOS) sol-gel ($SiO_2$) can be deposited onto a template followed by chemical reduction to silicon.

Various process techniques and process conditions are described in more detail in U.S. patent application Ser. No. 13/114,413, entitled "MULTIDIMENSIONAL ELECTROCHEMICALLY ACTIVE STRUCTURES FOR BATTERY ELECTRODES," filed on May 24, 2011, which is incorporated herein by reference in its entirety for purposes of describing these process techniques and process conditions.

Different deposition techniques, process conditions, and/or precursors may lead to active material coatings having different characteristics. In certain embodiments, operations 408-412 are repeated (decision block 414) to form multi-layered active material coatings that demonstrate superior cell performance characteristics in comparison with single-layered active material coatings. In one example, a first layer/coating of amorphous silicon is deposited using a PECVD technique followed by a second layer/coating of amorphous silicon deposited by a thermal CVD technique, or vice versa. Each of these two active material coatings has a different crystallinity, porosity, density, impurities' concentrations (e.g., hydrogen), vacancies, and residual stress levels. A series of tests was performed to determine effects of process conditions on an atomic density of silicon. In the first test, silicon was deposited using a thermal CVD technique at 520° C. resulting in a structure having of 95% of silicon and 5% of hydrogen and having a density of 5.40E22 atoms per cubic centimeter. In the second test, silicon was deposited using a thermal CVD technique but at a higher temperature of 550° C., which resulted in a structure having of 98% of silicon and 1% of hydrogen and having a density of only 5.16E22 atoms per cubic centimeter. Finally, in the third test, silicon was deposited using a PECVD technique at 520° C. resulting in a structure having of 89% of silicon and 11% of hydrogen and having a density of 5.88E22 atoms per cubic centimeter.

In another example, a first layer/coating of amorphous silicon is deposited using a thermal CVD technique using one set of process conditions (e.g., a substrate temperature, chamber pressure, precursors' compositions), while a second layer/coating is also deposited using a thermal CVD technique but another set of conditions. In yet another embodiment, a first layer/coating of amorphous silicon is deposited and then etched to form a porous amorphous silicon layer. A second layer/coating of amorphous silicon is the deposited over this porous layer. The second layer/coating may or may not undergo similar etching. A higher porosity of at least the first inner layer helps to overcome large volume changes of this silicon multilayer structure during cycling.

Figure 4B:
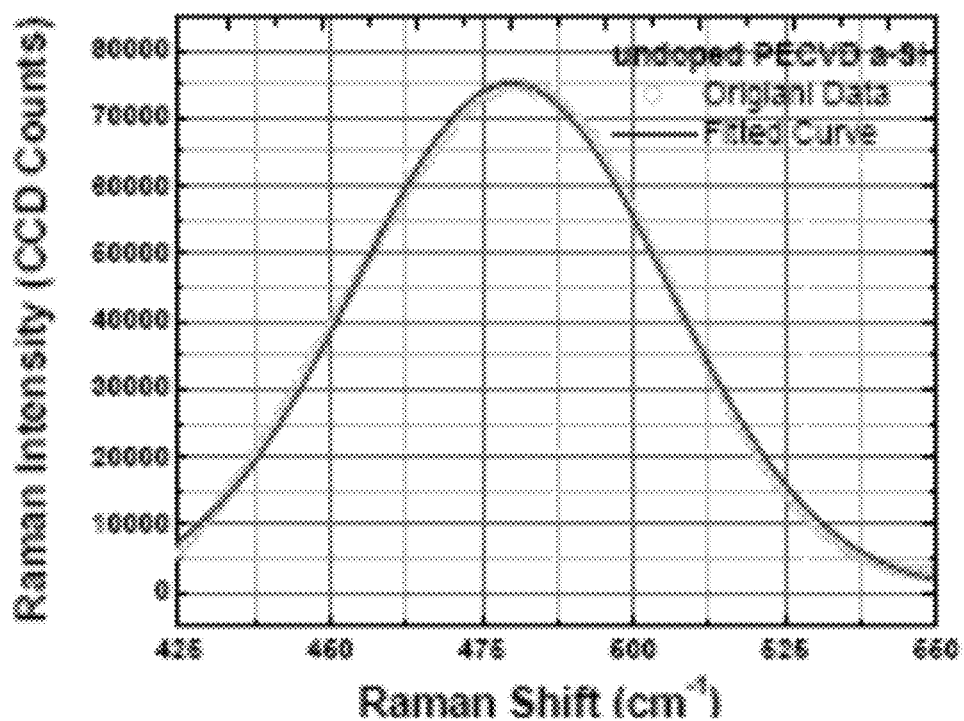
FIGS. 4B-4E illustrate Raman spectrums representing short range order (SRO) ratios of four amorphous silicon layers deposited using different process conditions.
Figure 4C:
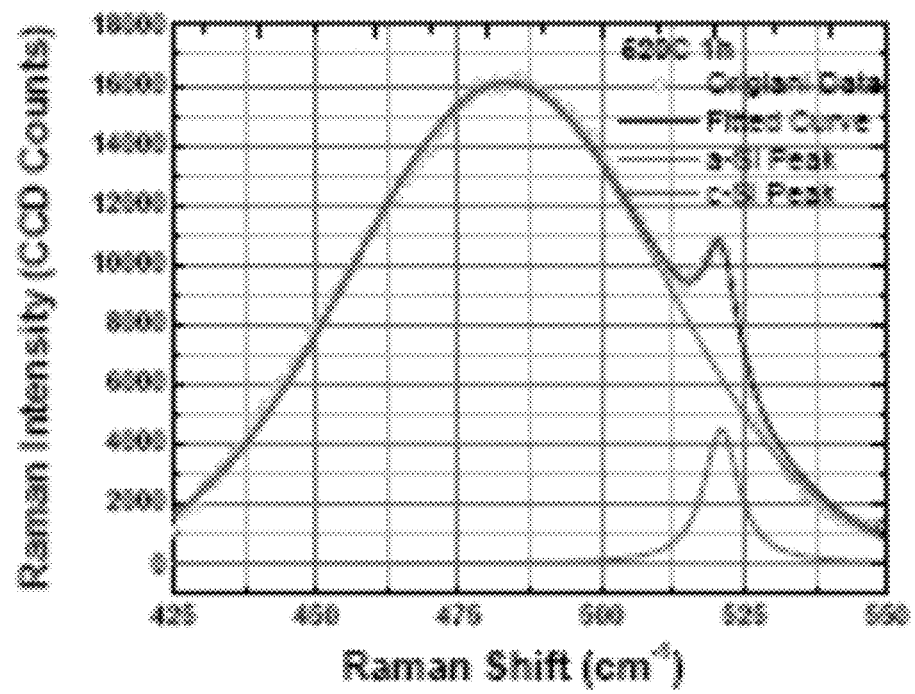
Figure 4D:
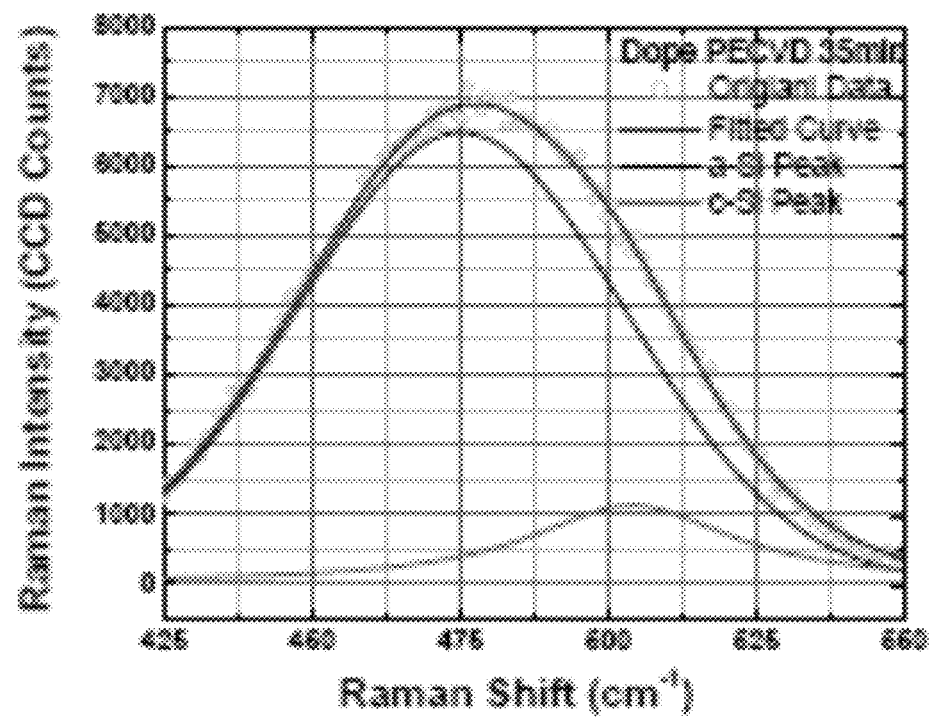
Figure 4E:
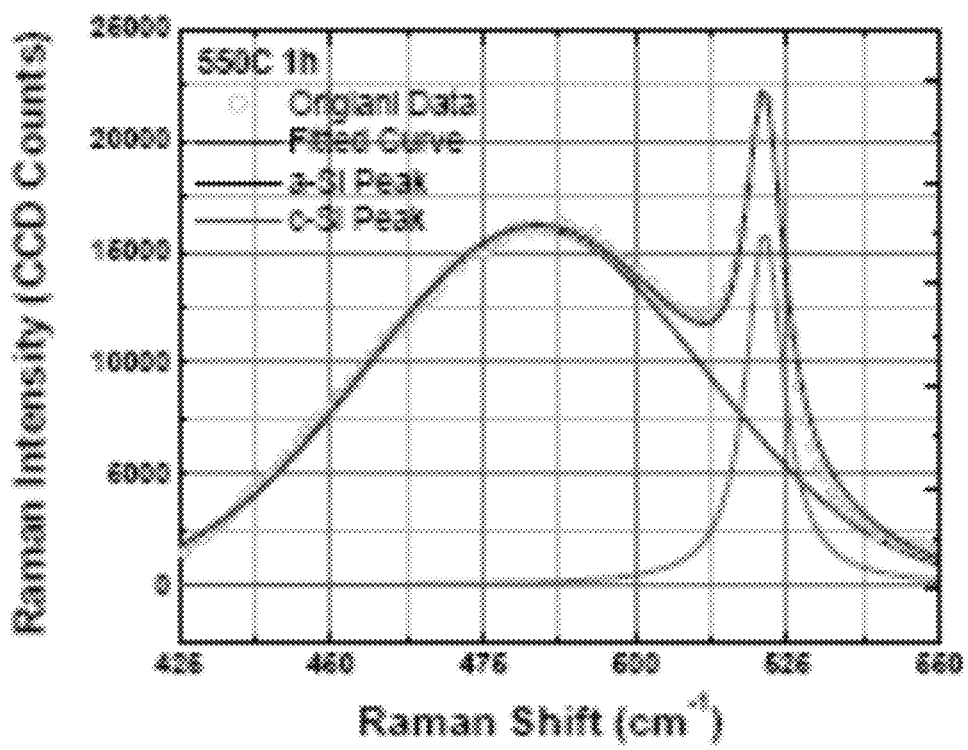

It has been found that short range disorder in the active material structures can greatly influence various cell performance characteristics. For example, different CVD techniques yield different short range order (SRO) ratios, which are believed to have impact the cycle life. FIGS. 4B-4E illustrates short range order ratios of four amorphous silicon coatings deposited using different process conditions. FIG. 4B corresponds to an un-doped amorphous silicon coating deposited using a PECVD process. FIG. 4C corresponds to a silicon layer deposited using a thermal CVD technique at 520° C. A curve fitting was used to determine that an ordered (crystalline) silicon phase is predominantly at 520 cm$^{-1}$ position. Another peak at about 480 cm$^{-1}$ corresponds to amorphous silicon. FIG. 4D corresponds to a doped silicon material deposited using a PECVD technique performed at about 550° C. From the curve fitting, it can be observed that a PECVD leads to almost all silicon deposited in an amorphous state. An SRO ration for silicon deposited using a thermal CVD at 520° C. was 4%, while for silicon deposited at 550° C., it was about 14%.

It has been also found that residual stresses in active material coatings may have significant impact on stability of these structures during cycling (i.e., lithiation and delithiation). Various deposition and post-deposition treatment process parameters have been investigated to determine effects of these parameters on the residual stress levels. For example, it has been found that some forms of etching and rapid thermal annealing can help with reducing the residual stresses in amorphous silicon structures and greatly improve cycle life of the resulting cells.

Figure 4F:
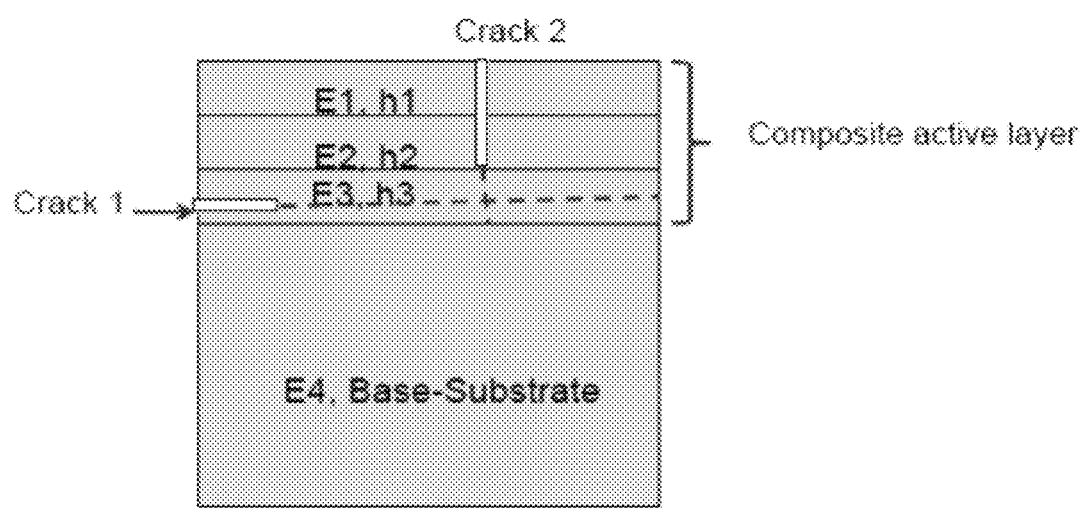
FIG. 4F is a schematic representation of a residual stress model for a multilayer electrode layer structure, in accordance with certain embodiments.

Furthermore, small initial defects formed in active material coatings may further develop during subsequent processing, e.g., post-deposition treatments and forming additional coating layers. For example, even a small crack may cause a large portion of the active material coating to buckle and loose contact with the underlying template structure. FIG. 4F is a schematic representation of a residual stress model for a multilayer electrode structure in accordance with certain embodiments. This model has been developed from linear elastic fracture mechanics (LEFM) for multi-layered coatings to estimate the stress level. According to this model, materials with different coefficient of thermal expansion (CTE) may be used to match strain between layers and reduce initial stresses to less than about 1 GPa range. This in turn may help to prevent cracking and separating of the coating at least during processing, where these materials are subjected to severe thermal fluctuations.

It has been found that specifically tailoring these characteristics of active material coatings help to overcome some of the stress induced fracture described above. In other words, more active material can be deposited on the same template structure without sacrificing cycling performance of the cell, while improving its overall capacity.

Figure 5A:
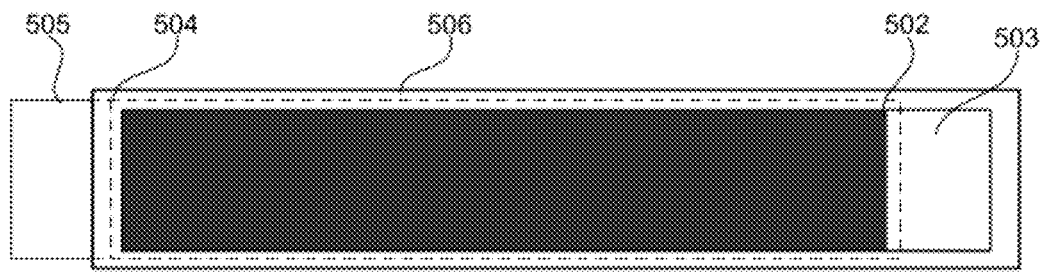
FIGS. 5A-B are top and side schematic views of an illustrative electrode arrangement in accordance with certain embodiments.

FIG. 5A is a plan view of a partially-assembled electrochemical cell that uses electrodes described herein, according to an embodiment of the invention. The cell has a positive electrode active layer 502 that is show covering a major portion of a positive current collector 503. The cell also has a negative electrode active layer 504 that is show covering a major portion of a negative current collector 505. Between the positive electrode active layer 502 and the negative electrode active layer 504 is a separator 506.

In one embodiment, the negative electrode active layer 504 is slightly larger than the positive electrode active layer 502 to ensure trapping of the lithium ions released from the positive electrode active layer 502 by the active material of the negative active layer 504. In one embodiment, the negative active layer 504 extends at least between about 0.25 and 5 mm beyond the positive active layer 502 in one or more directions. In a more specific embodiment, the negative layer extends beyond the positive layer by between about 1 and 2 mm in one or more directions. In certain embodiments, the edges of the separator 506 extend beyond the outer edges of at least the negative active layer 504 to provide complete electronic insulation of the negative electrode from the other battery components.

Figure 5B:
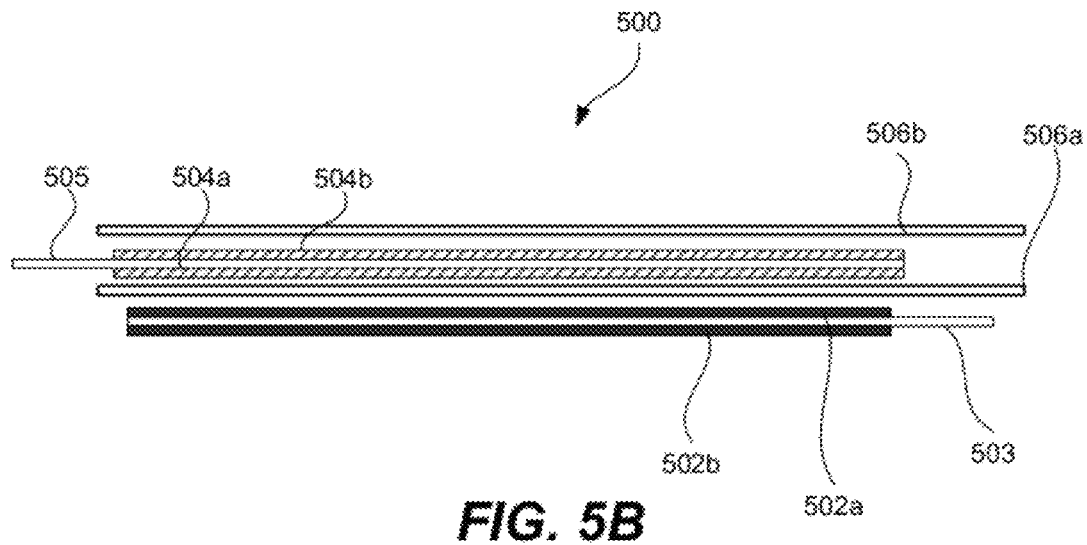

FIG. 5B is a cross-section view of a partially-assembled electrochemical cell 500 that uses electrodes described herein, according to an embodiment of the invention. Cell 500 includes a positive current collector 503 that has a positive electrode active layer 502a on one side and a positive electrode active layer 502b on the opposite side. Cell 500 also includes a negative current collector 505 that has a negative electrode active layer 504a on one side and a negative electrode active layer 504b on the opposite side. There is a separator 506a between the positive electrode active layer 502a and the negative electrode active layer 504a. The separator 506 serves to maintain mechanical separation between the positive electrode active layer 502a and the negative electrode active layer 504a and acts as a sponge to soak up liquid electrolyte (not shown) that will be added later. The ends of the current collectors 503, 505 on which there is no active material can be used for connecting to the appropriate terminal of a cell (not shown).

The electrode layers 502a, 504a, the current collectors 503, 505, and the separator 506a together can be said to form one electrochemical cell unit. The complete stack 500 shown in FIG. 5B, includes the electrode layers 502b, 504b and the additional separator 506b. The current collectors 503, 505 can be shared between adjacent cells. When such stacks are repeated, the result is a cell or battery with larger capacity than that of a single cell unit.

Figure 6A:
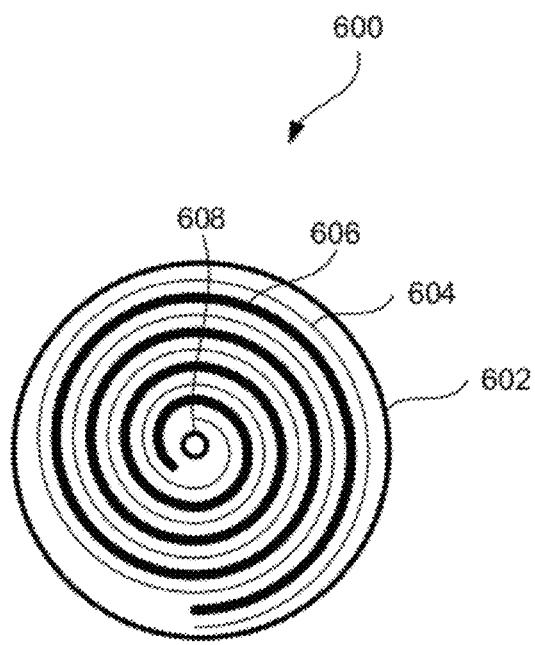
FIGS. 6A-B are top and perspective schematic views of an illustrative round wound cell in accordance with certain embodiments.
Figure 6B:
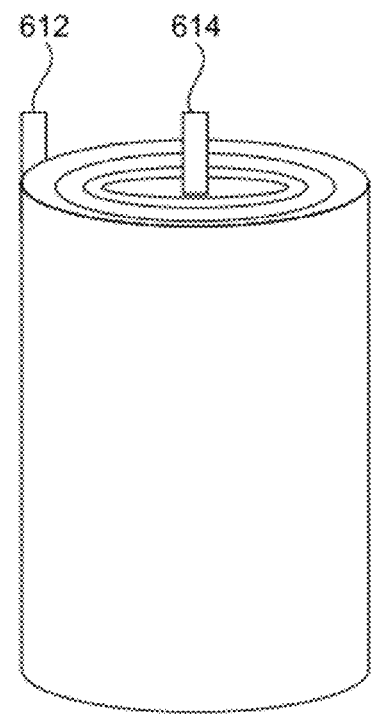

Another way to make a battery or cell with large capacity is to make one very large cell unit and wind it in upon itself to make multiple stacks. The cross-section schematic illustration in FIG. 6A shows how long and narrow electrodes can be wound together with two sheets of separator to form a battery or cell, sometimes referred to as a jellyroll 600. The jellyroll is shaped and sized to fit the internal dimensions of a curved, often cylindrical, case 602. The jellyroll 600 has a positive electrode 606 and a negative electrode 604. The white spaces between the electrodes are the separator sheets. The jelly roll can be inserted into the case 602. In some embodiments, the jellyroll 600 may have a mandrel 608 in the center that establishes an initial winding diameter and prevents the inner winds from occupying the center axial region. The mandrel 608 may be made of conductive material, and, in some embodiments, it may be a part of a cell terminal. FIG. 6B shows a perspective view of the jelly roll 600 with a positive tab 612 and a negative tab 614 extending from the positive current collector (not shown) and the negative current collector (not shown), respectively. The tabs may be welded to the current collectors.

The length and width of the electrodes depend on the overall dimensions of the cell and thicknesses of the active layers and the current collectors. For example, a conventional 18650 cell with 18 mm diameter and 65 mm length may have electrodes that are between about 300 and 1000 mm long. Shorter electrodes corresponding to lower rate/higher capacity applications are thicker and have fewer winds.

A cylindrical design may be desirable for some lithium ion cells because the electrodes can swell during cycling and thus exert pressure on the casing. It is useful to use a cylindrical casing that is as thin as possible while still able to maintain sufficient pressure on the cell (with a good safety margin). Prismatic (flat) cells may be similarly wound, but their case may be flexible so that they can bend along the longer sides to accommodate the internal pressure. Moreover, the pressure may not be the same within different parts of the cell, and the corners of the prismatic cell may be left empty. Empty pockets are not desirable within lithium ions cells because electrodes tend to be unevenly pushed into these pockets during electrode swelling. Moreover, the electrolyte may aggregate in empty pockets and leave dry areas between the electrodes, negatively affecting lithium ion transport between the electrodes. Nevertheless, for certain applications, such as those dictated by rectangular form factors, prismatic cells are appropriate. In some embodiments, prismatic cells employ stacks of rectangular electrodes and separator sheets to avoid some of the difficulties encountered with wound prismatic cells.

Figure 7:
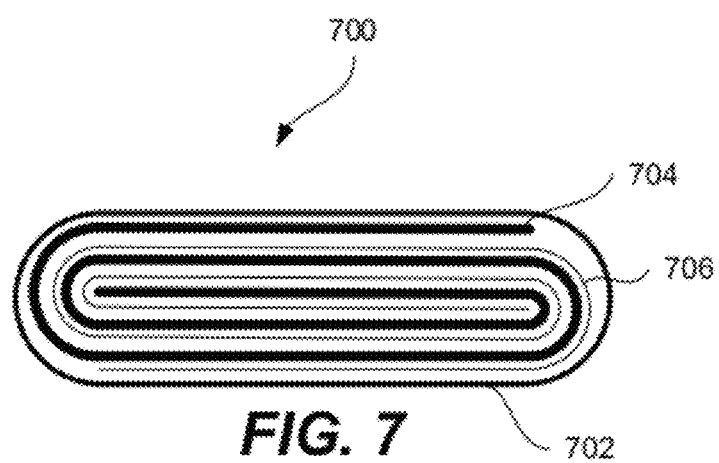
FIG. 7 is a top schematic view of an illustrative prismatic wound cell in accordance with certain embodiments.

FIG. 7 illustrates a top view of a wound prismatic jellyroll 700. The jellyroll 700 includes a positive electrode 704 and a negative electrode 706. The white space between the electrodes is the separator sheet. The jelly roll 700 is enclosed in a rectangular prismatic case 702. Unlike cylindrical jellyrolls shown in FIGS. 6A and 6B, the winding of the prismatic jellyroll starts with a flat extended section in the middle of the jelly roll. In one embodiment, the jelly roll may include a mandrel (not shown) in the middle of the jellyroll onto which the electrodes and separator are wound.

Figure 8A:
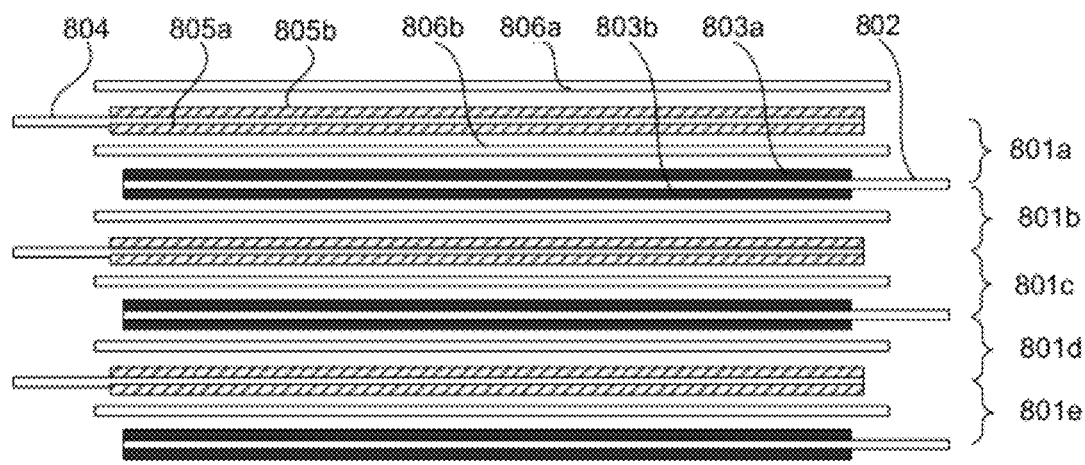
FIGS. 8A-B are top and perspective schematic views of an illustrative stack of electrodes and separator sheets in accordance with certain embodiments.
Figure 8B:
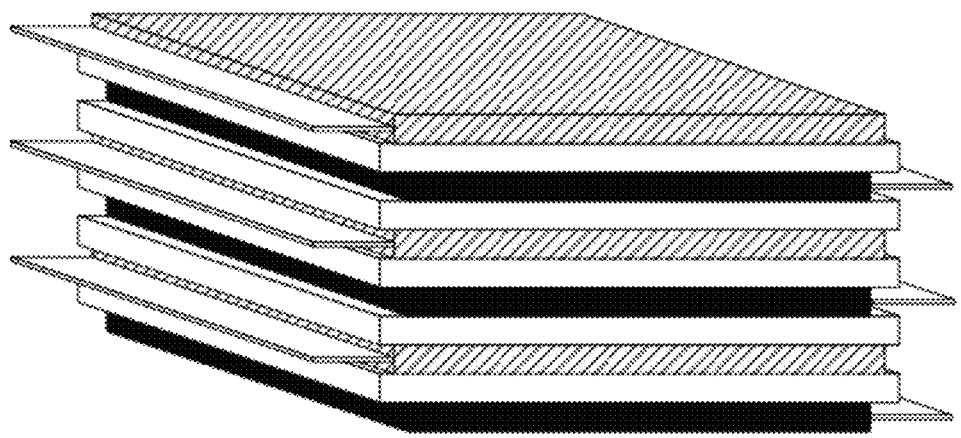

FIG. 8A illustrates a cross-section of a stacked cell that includes a plurality of cells (801a, 801b, 801c, 801d, and 801e), each having a positive electrode (e.g., 803a, 803b), a positive current collector (e.g., 802), a negative electrode (e.g., 805a, 805b), a negative current collector (e.g., 804), and a separator (e.g., 806a, 806b) between the electrodes. Each current collector is shared by adjacent cells. One advantage of stacking cells is that the stack can be made in almost any shape, which is particularly suitable for prismatic batteries. The current collector tabs typically extend from the stack and lead to a battery terminal. FIG. 8B shows a perspective view of a stacked cell that includes a plurality of cells.

Once the electrodes are arranged as described above, the battery is filled with electrolyte. The electrolyte in lithium ions cells may be liquid, solid, or gel. Lithium ion cells with the solid electrolyte are also referred to as a lithium polymer cells.

A typical liquid electrolyte includes one or more solvents and one or more salts, at least one of which includes lithium. During the first charge cycle (sometimes referred to as a formation cycle), the organic solvent in the electrolyte can partially decompose on the negative electrode surface to form a solid electrolyte interphase layer (SEI layer). The interphase is generally electrically insulating but ionically conductive, allowing lithium ions to pass through. The interphase also prevents decomposition of the electrolyte in the later charging sub-cycles.

Some examples of non-aqueous solvents suitable for some lithium ion cells include the following: cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), and organic compounds containing an S=O group (e.g., dimethyl sulfone and divinyl sulfone), and combinations thereof.

Non-aqueous liquid solvents can be employed in combination. Examples of the combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In one embodiment, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:0, preferably 2:8 to 7:3, by volume.

A salt for liquid electrolytes may include one or more of the following: $LiPF_6$, $LiBF_4$, $LiClO_4$ $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$), and combination of thereof. Common combinations include $LiPF_6$ and $LiBF_4$, $LiPF_6$ and $LiN(CF_3SO_2)_2$, $LiBF_4$ and $LiN(CF_3SO_2)_2$.

In one embodiment the total concentration of salt in a liquid non-aqueous solvent (or combination of solvents) is at least about 0.3 M; in a more specific embodiment, the salt concentration is at least about 0.7M. The upper concentration limit may be driven by a solubility limit or may be no greater than about 2.5 M; in a more specific embodiment, no more than about 1.5 M.

A solid electrolyte is typically used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as Polyvinylidene fluoride (PVDF) or chloride or copolymer of their derivatives, Poly(chlorotrifluoroethylene), poly(ethylene-chlorotrifluoro-ethylene), or poly(fluorinated ethylene-propylene), Polyethylene oxide (PEO) and oxymethylene linked PEO, PEO-PPO-PEO crosslinked with trifunctional urethane, Poly(bis(methoxy-ethoxy-ethoxide))-phosphazene (MEEP), Triol-type PEO crosslinked with difunctional urethane, Poly((oligo)oxyethylene)methacrylate-co-alkali metal methacrylate, Polyacrylonitrile (PAN), Polymethylmethacrylate (PNMA), Polymethylacrylonitrile (PMAN), Polysiloxanes and their copolymers and derivatives, Acrylate-based polymer, other similar solvent-free polymers, combinations of the foregoing polymers either condensed or cross-linked to form a different polymer, and physical mixtures of any of the foregoing polymers. Other less conductive polymers may be used in combination with the above polymers to improve strength of thin laminates include: polyester (PET), polypropylene (PP), polyethylene napthalate (PEN), polyvinylidene fluoride (PVDF), polycarbonate (PC), polyphenylene sulfide (PPS), and polytetrafluoroethylene (PTFE).

Figure 9:
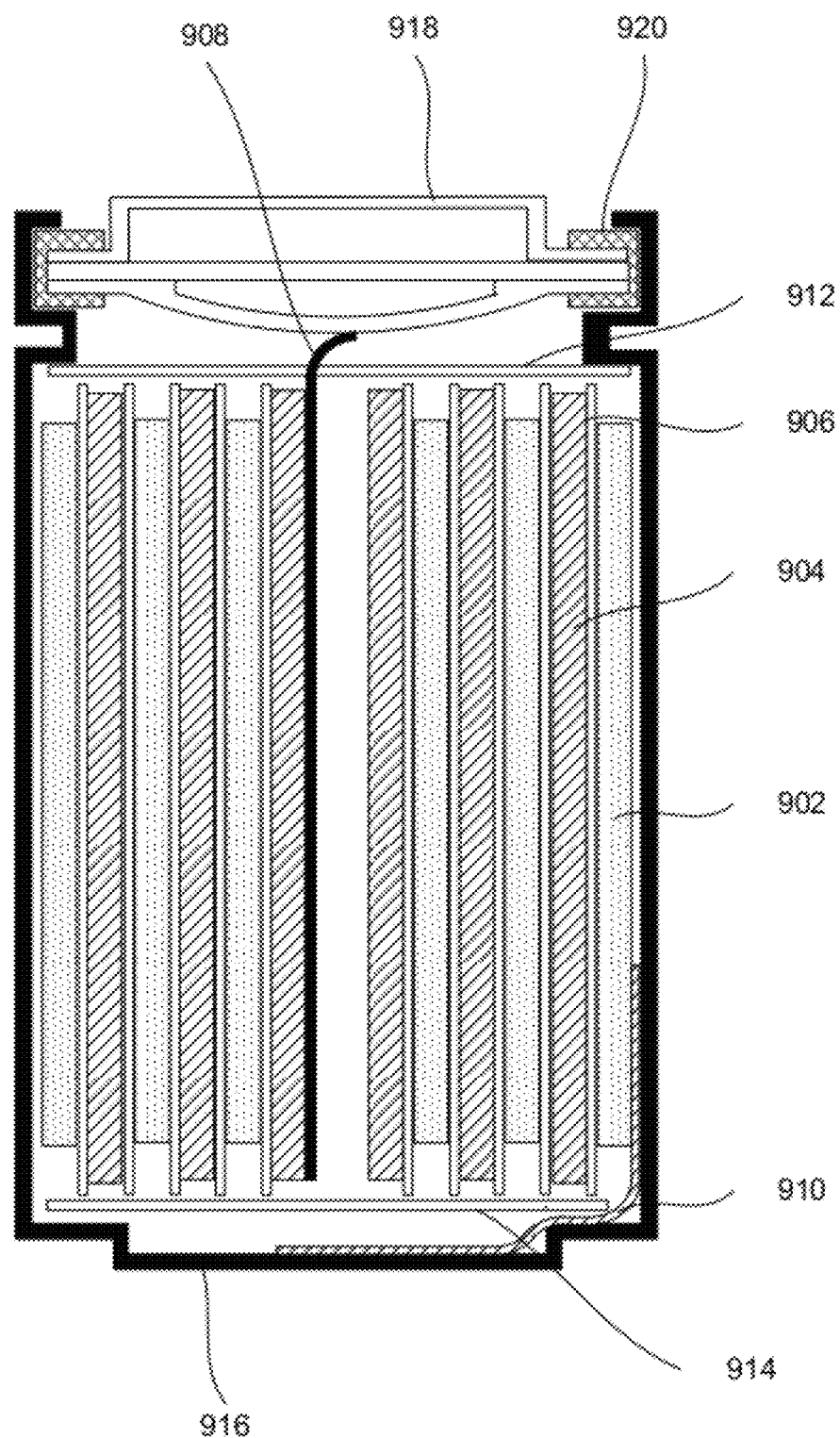
FIG. 9 is a schematic cross-section view of an example of a wound cell in accordance with embodiments.

FIG. 9 illustrates a cross-section view of the wound cylindrical cell in accordance with one embodiment. A jelly roll includes a spirally wound positive electrode 902, a negative electrode 904, and two sheets of the separator 906. The jelly roll is inserted into a cell case 916, and a cap 918 and gasket 920 are used to seal the cell. In some cases, cap 912 or case 916 includes a safety device. For example, a safety vent or burst valve may be employed to break open if excessive pressure builds up in the battery. Also, a positive thermal coefficient (PTC) device may be incorporated into the conductive pathway of cap 918 to reduce the damage that might result if the cell suffered a short circuit. The external surface of the cap 918 may used as the positive terminal, while the external surface of the cell case 916 may serve as the negative terminal. In an alternative embodiment, the polarity of the battery is reversed and the external surface of the cap 918 is used as the negative terminal, while the external surface of the cell case 916 serves as the positive terminal. Tabs 908 and 910 may be used to establish a connection between the positive and negative electrodes and the corresponding terminals. Appropriate insulating gaskets 914 may be inserted to prevent the possibility of internal shorting. For example, a Kapton™ film may be used for internal insulation. During fabrication, the cap 918 may be crimped to the case 916 in order to seal the cell. However prior to this operation, electrolyte (not shown) is added to fill the porous spaces of the jelly roll.

A rigid case is typically required for lithium ion cells, while lithium polymer cells may be packed into a flexible, foil-type (polymer laminate) case. A variety of materials can be chosen for the case. For lithium-ion batteries, Ti-6-4, other Ti alloys, Al, Al alloys, and 300 series stainless steels may be suitable for the positive conductive case portions and end caps, and commercially pure Ti, Ti alloys, Cu, Al, Al alloys, Ni, Pb, and stainless steels may be suitable for the negative conductive case portions and end caps.

A lithium ion battery, which may form or be part of a cell pack or a battery pack, includes one or more lithium ion electrochemical cells of this invention, each containing electrochemically active materials. In addition to the cells, a lithium ion battery may also include a power management circuit to control balance power among multiple cells, control charge and discharge parameters, ensure safety (thermal and electrical runaways), and other purposes. Individual cells may be connected in series and/or in parallel with each other to form a battery with appropriate voltage, power, and other characteristics.

In addition to the battery applications described above, metal silicides may be used in fuel cells (e.g., for negative electrodes, positive electrodes, and electrolytes), hetero junction solar cell active materials, various forms of current collectors, and/or absorption coatings. Some of these applications can benefit from a high surface area provided by metal silicide structures, high conductivity of silicide materials, and fast inexpensive deposition techniques.

Figure 10:
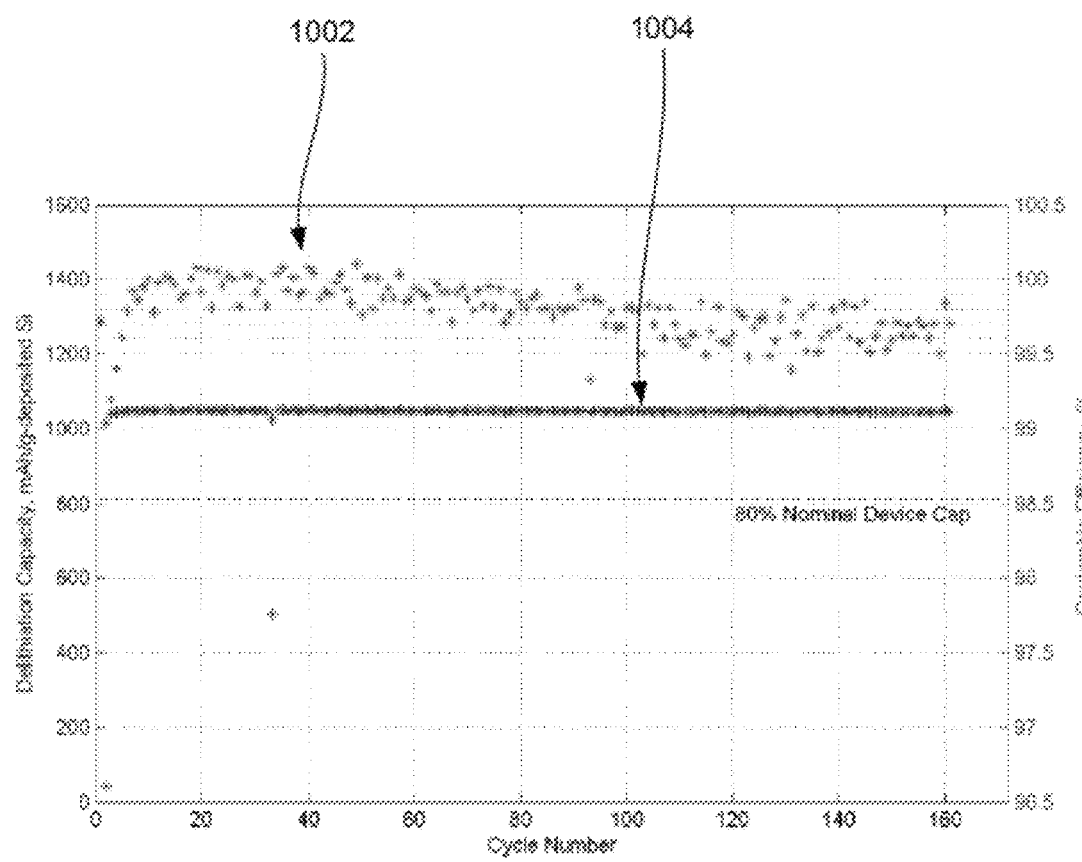
FIG. 10 is cycling data corresponding to a cell fabricated using electrode material described herein.

A series of tests were performed on cells fabricated using various techniques described above. FIG. 10 illustrates cycling data corresponding to one such cell. Specifically, FIG. 10 illustrates columbic efficiency 1002 and delithiation capacity 1004 over 160 cycles. The cell maintained a stable capacity of over 1000 mAh/g over this number of cycles. The columbic efficiency was at about 99.1% in each cycle.

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. Accordingly, the present embodiments are to be considered as illustrative and not restrictive, and the invention is not to be limited to the details given herein.

What is claimed is:

1. An electrode material comprising:
an electronically conductive layer;
a layer of first nanostructures positioned on the electronically conductive layer, the first nanostructures comprising one or more metal silicides;
a layer of second nanostructures positioned on the layer of the first nanostructures; and
a coating of electrode active material that covers at least a portion of the first nanostructures and the second nanostructures.

2. The electrode material of claim 1, wherein the one or more metal silicides are selected from the group consisting of nickel silicides, cobalt silicides, copper silicides, silver silicides, chromium silicides, titanium silicides, aluminum silicides, zinc silicides, and iron silicides.

3. The electrode material of claim 2, wherein the one or more metal silicides are selected from the group consisting of $Ni_2Si$, $NiSi$, and $NiSi_2$, and combinations thereof.

4. The electrode material of claim 1, wherein the electronically conductive layer comprises stainless steel.

5. The electrode material of claim 1, wherein the electrode active material comprises one or more materials selected from the group consisting of crystalline silicon, amorphous silicon, silicon oxides, silicon oxy-nitrides, tin-containing materials, germanium-containing materials, and carbon-containing materials.

6. The electrode material of claim 1, wherein the layer of the first nanostructures comprises a plurality of nanowires rooted to the electronically conductive layer.

7. The electrode material of claim 1, wherein the electrode material has porosity between about 30% and 50%.

8. The electrode material of claim 1, wherein the coating of the electrode active material comprises multiple layers.

9. The electrode material of claim 8, wherein the multiple layers comprise at least some layers that have different porosities.

10. The electrode material of claim 9, wherein the multiple layers comprise an inner layer and an outer layer, and wherein the inner layer has a lower porosity than the outer layer.

11. The electrode material of claim 8, wherein the multiple layers comprise at least some layers that have different hydrogen concentrations.

12. The electrode material of claim 8, wherein the multiple layers comprise at least some layers that have different compositions.

13. The electrode material of claim 8, wherein the multiple layers comprise at least some layers that have different morphologies.

14. The electrode material of claim 1, wherein the coating of the electrode active material is positioned between at least a portion of the layer of the first nanostructures and the layer of the second nanostructures.

15. The electrode material of claim 1, wherein the layer of the second nanostructures comprises carbon nanofibers.

16. The electrode material of claim 1, wherein the layer of the second nanostructures comprises multidimensional metal silicide structures.

17. The electrode material of claim 16, wherein the multidimensional metal silicide structures comprise support structures to which plurality of metal silicide nanowires are attached.

18. An electrode assembly comprising:
a conductive substrate for conducting electrical current between an electrode active material and battery terminal; and
an electrode material comprising:
   a layer of first nanostructures attached to the conductive substrate, the first nanostructures comprising one or more metal silicides;
   a layer of second nanostructures positioned on the layer of the first nanostructures; and
   a coating of the electrode active material that covers at least a portion of the first nanostructures and the second nanostructures,
   wherein the first nanostructures and the second nanostructures provide electronic communication between the electrode active material and conductive substrate.

19. An electrochemical cell comprising:
a first electrode comprising an electronically conductive layer, a layer of first nanostructures positioned on the electronically conductive layer, wherein the first nanostructures comprising one or more metal silicides, a layer of second nanostructures positioned on the layer of the first nanostructures, and a coating of electrode active material that covers at least a portion of the first nanostructures and the second nanostructures;
a second electrode; and
an electrolyte providing ionic communication between the first electrode and the second electrode.

* * * * *